United States Patent [19]

Murakami et al.

[11] Patent Number: 5,195,001
[45] Date of Patent: Mar. 16, 1993

[54] ROTARY HEAD TYPE TAPE RECORDING AND/OR REPRODUCING APPARATUS

[75] Inventors: Atsushi Murakami; Kiyotaka Yanaka, both of Tokyo, Japan

[73] Assignee: Sony Corporation, Tokyo, Japan

[21] Appl. No.: 620,077

[22] Filed: Nov. 30, 1990

[30] Foreign Application Priority Data

Dec. 6, 1989 [JP] Japan .................................. 1-317021

[51] Int. Cl.$^5$ ............................................. G11B 5/027
[52] U.S. Cl. .................................... 360/85; 360/130.23
[58] Field of Search ...................... 360/85, 95, 130.22, 360/130.23, 130.24

[56] References Cited

U.S. PATENT DOCUMENTS

| | | |
|---|---|---|
| 3,512,694 | 5/1970 | Sugaya et al. . |
| 3,588,378 | 6/1971 | Protas . |
| 3,679,840 | 7/1972 | Maxey ...................... 360/130.23 |
| 3,766,328 | 10/1973 | Warren . |
| 3,943,566 | 3/1976 | Brock et al. ................ 360/130.23 |
| 4,200,895 | 4/1980 | Repp ........................... 360/130.23 |
| 4,213,162 | 7/1980 | Lemelson . |
| 4,441,133 | 4/1984 | Ogawa et al. ............. 360/130.22 |
| 4,580,180 | 4/1986 | Murakushi ................. 360/130.24 |
| 4,757,397 | 7/1988 | Zaitsu et al. .................... 360/95 |
| 5,036,412 | 7/1991 | Shiraishi et al. ................ 360/95 |

FOREIGN PATENT DOCUMENTS

| | | |
|---|---|---|
| 0003444 | 8/1979 | European Pat. Off. . |
| 0022651 | 1/1981 | European Pat. Off. . |
| 3544090 | 6/1987 | Fed. Rep. of Germany . |
| 2013052 | 3/1970 | France . |
| 1286470 | 8/1972 | United Kingdom . |

*Primary Examiner*—A. J. Heinz
*Attorney, Agent, or Firm*—Hill, Steadman & Simpson

[57] ABSTRACT

A rotary head type tape recording and/or reproducing apparatus comprises a rotary head drum having a rotary head for recording and/or reproducing information signals onto or from a magnetic tape helically wrapped around the rotary head drum with a predetermined wrap angle and an outer peripheral surface of the drum being free of leads for restricting the movement of the wrapped magnetic tape in the width direction; a pair of tape guides having flange portions which are located near both sides of the rotary head drum and restrict the movement of the magnetic tape in the width direction; and a head drum supporting and moving arrangement for fixing the rotary head drum and the pair of tape guides and moving so as to be in contact with or away from a cassette loading arrangement which loads and supports a tape cassette in which the magnetic tape is enclosed.

6 Claims, 22 Drawing Sheets

ROTARY HEAD TYPE TAPE RECORDING AND/OR REPRODUCING APPARATUS

BACKGROUND OF THE INVENTION

1. Field of the Invention

The present invention relates to a rotary head type tape recording and/or reproducing apparatus. More particularly, the invention relates to a rotary head type tape recording and/or reproducing apparatus in which the position of a tape path for a head drum is correctly restricted.

2. Description of the Prior Art

A tape player for recording and/or reproducing has a running tape in a state in which the tape is wrapped around a head drum, which has a rotary head, at a predetermined wrap angle. If a relative position of the tape for the head drum, in other words, for the rotary head, is not accurately restricted, the linearity and reproducibility of a recording track and a scanning line upon reproduction are lost. Therefore, it is necessary to use means for accurately restricting the relative position of the tape for the head drum.

Accordingly, hitherto, a micro stairway or ledge portion, which is called a lead, is formed on the head drum and the tape is moved in a state in which one of the edges of the tape is slid along the lead.

In FIG. 1, reference character a indicates a head drum of the upper drum rotating type.

A lower drum b is fixed to a chassis (not shown). A lead c is formed as an upward micro ledge or stairway surface on an outer peripheral surface of the lower drum b.

An upper drum d is located so as to overlay an upper side or surface of the lower drum b and is rotatably provided for the lower drum b. A rotary head f is arranged in a notch e formed on an outer peripheral edge of the lower surface of the upper drum d.

A tape g is wrapped around the head drum a at a predetermined wrap angle in a state in which a lower edge of the tape g is in contact with the lead c. The tape g is moved in the direction shown by an arrow. A path of the tape g is restricted by tape guides and the like (not shown). The wrapping operation of the tape g onto the head drum a is started at an angle $\theta_2$. A moving force in the downward direction is applied to the portion of the tape g which was wrapped around the head drum a by the above components, a tape tension, and the like. Thus, the tape g moves so that its lower edge slides along the lead c.

In FIG. 2, a head drum h is of the type in which an upper drum k and a lower drum i are fixed and a middle drum is rotatable.

The lower drum i is fixed to a chassis (not shown). A lead j is formed on an outer peripheral surface of the lower drum i.

The upper drum k is provided on the upper side of the lower drum i so as to be fixed to the lower drum i. A small gap l is formed between the outer peripheral surfaces of the upper and lower drums k and i.

A middle drum (not shown) is rotatably arranged between the lower and upper drums i and k. A rotary head m is supported on the middle drum. The rotary head m moves in the tape gap l.

The tape g is wrapped around the head drum h at a predetermined wrap angle in a state in which a lower edge of the tape g is in contact with the lead j. Then, the tape g is moved in the direction shown by an arrow. Moving forces indicated by arrows $F_1$ and $F_2$ are applied to the tape g. Thus, the tape g is moved in a state in which its lower edge is always in contact with the lead j.

It is necessary to form the leads c and j for both of the foregoing head drums a and h and a high accuracy is required to form the leads c and j, so that the manufacturing costs are high.

On the other hand, in order to allow the tape g to move along the leads c and j, it is necessary to accurately manage the angles $\theta_1$, $\theta_2$, the tape tension, the rigidity of the tape, and the magnitudes of forces $F_1$ and $F_2$. If the values of $\theta_1$, $\theta_2$, $F_1$ and $F_2$, are small, the lower edge of the tape g floats from the leads c and j, so that the positions of the tape g for the head drums a and h become unstable. However, if the $\theta_1$, $\theta_2$, $F_1$ and $F_2$ are too large as compared with the rigidity of the tape g, an accident can occur, such as the lower edge of the tape g being peeled off and deformed or the like. Therefore, it is necessary to very carefully manage the values of $\theta_1$, $\theta_2$, $F_1$ and $F_2$, the tape tension, the rigidity of the tape, or the like. These factors will cause an increase in the costs of the tape player.

SUMMARY OF THE INVENTION

It is, therefore, an object of the invention to provide a tape player having a rotary head which can reduce the working cost of the head drum remarkably and contributes to the reduction of the costs of the tape player.

It is another object of the invention to provide a tape player having a rotary head in which an air film can be easily formed and the design difficulties or the like for obtaining a desired air film are solved.

It is still another object of the invention to provide a tape player having a rotary head in which a damage of the edge of the tape will hardly occur.

According to an aspect of the present invention, a rotary head type tape recording and/or reproducing apparatus is provided and comprises:

rotary head drum means having a rotary head for recording and/or reproducing information signals onto/from a magnetic tape helically wrapped around the rotary head drum means with a predetermined wrap angle and an outer peripheral surface on which leads for restricting the movement of the wrapped magnetic tape in the width direction are not provided;

a pair of tape guide means having flange portions which are located near both sides of the rotary head drum means and restrict the movement of the magnetic tape in the width direction; and head drum supporting and moving means for fixing the rotary head drum means and the pair of tape guide means and moving so as to be in contact with or away from cassette loading means for loading and supporting a tape cassette in which the magnetic tape is enclosed.

The above, and other objects, features and advantages of the present invention will become readily apparent from the following detailed description thereof which is to be read in connection with the accompanying drawings.

BRIEF DESCRIPTION OF THE DRAWINGS

FIGS. 16–21 are each partial top plan views with portions removed illustrating different positions of the operating mechanism in different modes of operation, with:

FIG. 16 showing a state in which the operating mechanism is set at a non-pressing or non-depressed position;

FIG. 17 showing a state in which the operating mechanism is set to the recording and/or reproducing modes;

FIG. 18 showing a state in which a stop/eject button was depressed in the recording and/or reproducing modes;

FIG. 19 showing an ejecting state;

FIG. 20 showing a state in the rewinding mode; and

FIG. 21 showing a state in the fast forward mode;

DETAILED DESCRIPTION OF THE PREFERRED EMBODIMENTS

Figure 1:
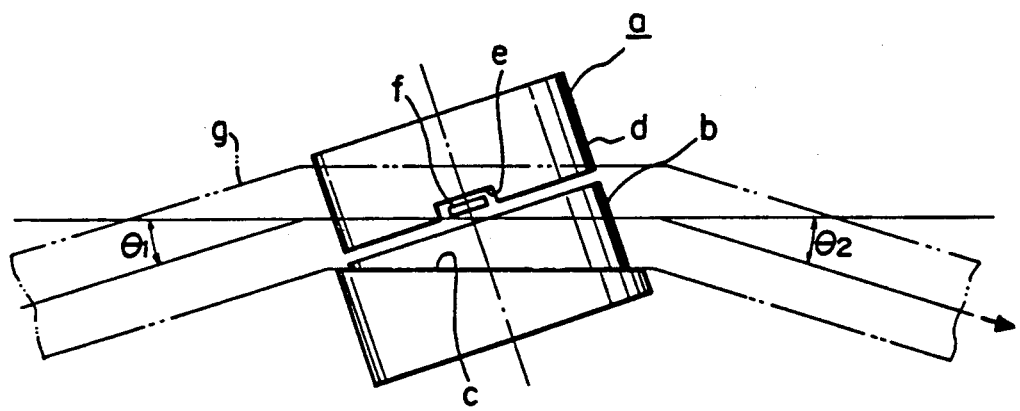
FIGS. 1 and 2 are schematic front views showing examples of conventional rotary heads, respectively.
Figure 2:
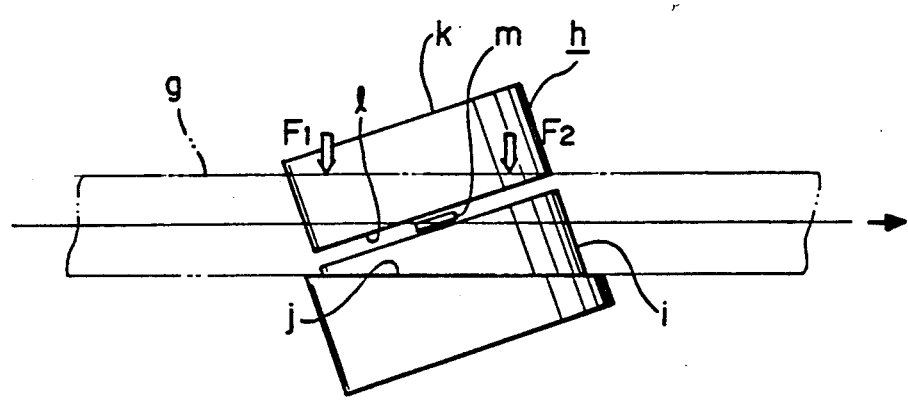

The details of a tape player have a rotary head according to the present invention will be described hereinbelow in accordance with an embodiment shown in the drawings (FIGS. 1 to 21).

a) Tape Cassette

Figure 3:
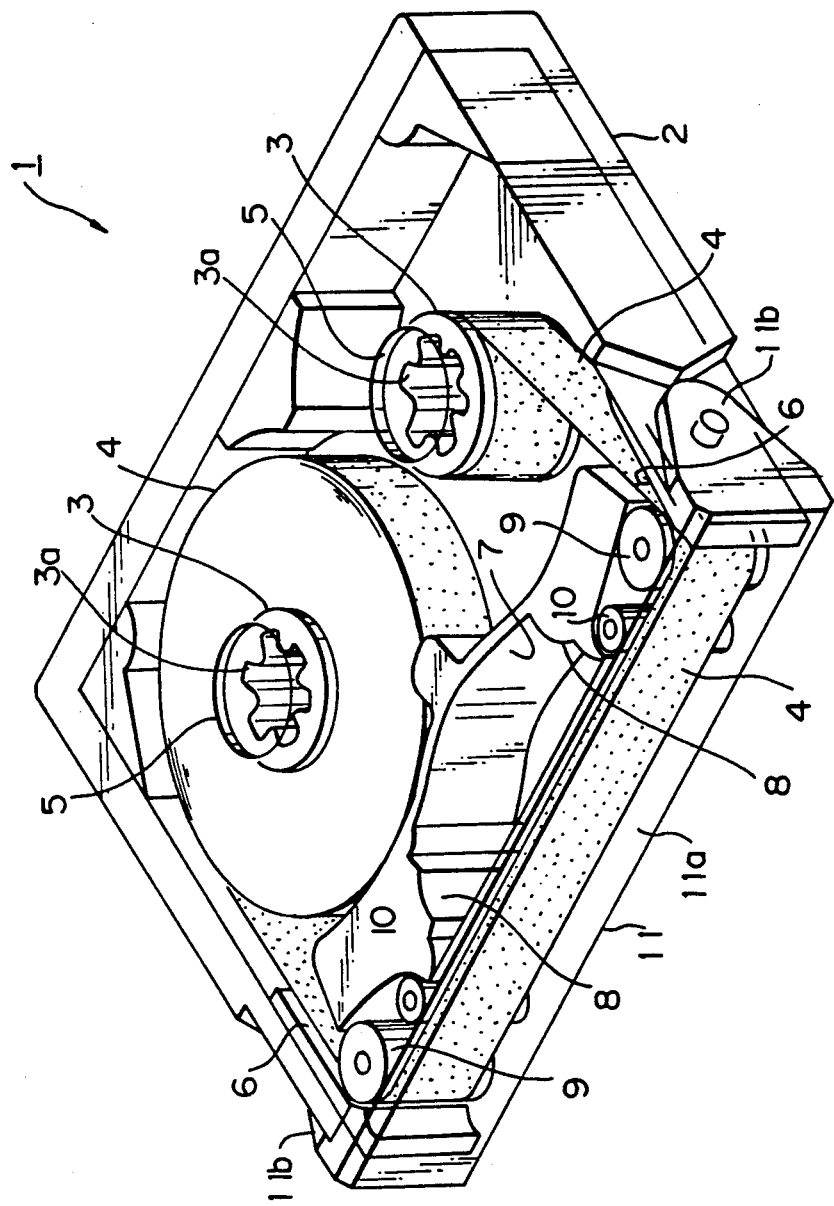
FIG. 3 is a perspective view of a tape cassette used in an embodiment of a tape player having a rotary head according to the present invention.
Figure 4:
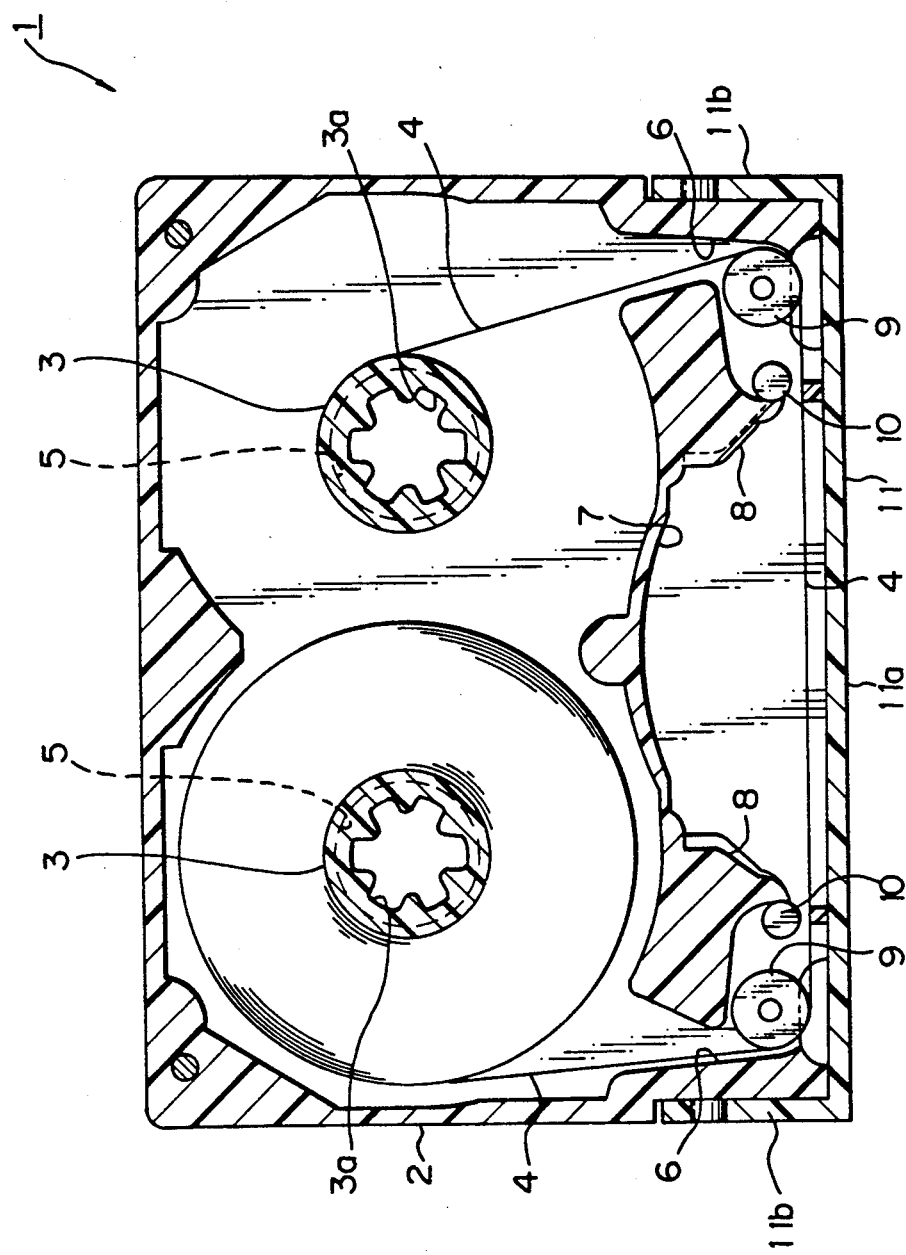
FIG. 4 is a horizontal cross sectional view of the tape cassette used in an embodiment of a tape player having a rotary head according to the present invention.
Figure 5A:
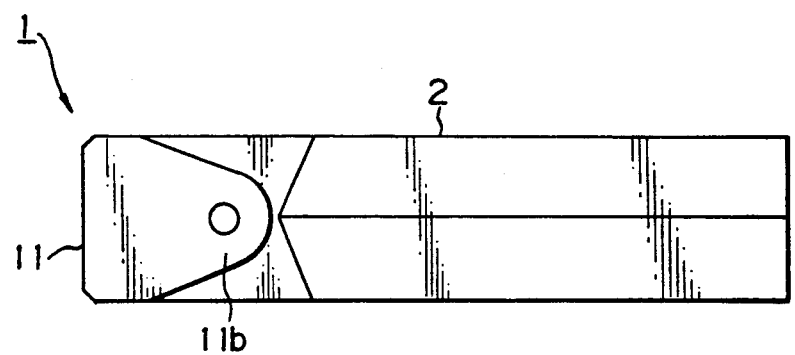
FIG. 5A is a side elevational view of the tape cassette used in an embodiment of the tape player having a rotary head according to the present invention.
Figure 5B:
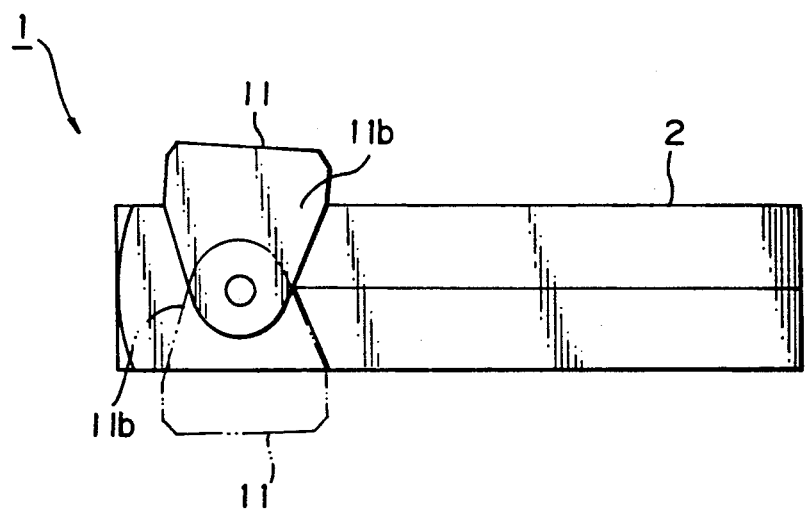
FIG. 5B is a side elevational view of FIG. 5A with the lid in an open position.

First, a tape cassette 1, which is used in the tape player of the invention, will be described and is illustrated in FIGS. 3–5.

The cassette 1 has a cassette casing 2 with a rectangular flat box-like shape which is long in the right and left directions when it is seen from the upper position (FIG. 4). The casing has two flat walls, two end walls, a rear wall and an open front which is closed by a front lid 11.

Two tape reels 3 are rotatably enclosed in the cassette casing 2. A magnetic tape 4 is wrapped around the tape reels 3.

Two through holes 5 are formed in each of two walls of the cassette casing 2, which face in the thickness direction thereof. Engaging holes or splined bores 3a are formed in the tape reels 3 and are engageable from the outside via the through holes 5.

Tape exits 6 are formed in both of right and left side portions of the front surface of the cassette casing 2. The magnetic tape 4 is lead out of the tape exits 6 to the outside of the cassette casing 2. The tape exits 6 are located along a front surface of the cassette casing 2.

A head drum inserting concave portions or cavity 7 is formed in a portion of the front edge or side portion of the cassette casing 2 excluding both end portions formed with the tape exits 6. The head drum inserting concave portion 7 opens toward the front side and both of the upper and lower edges or surfaces are closed.

Contacting surfaces 8 are formed at positions which are slightly offset to the center from both of the right and left sides in the head drum inserting concave portion 7. When a head drum, which will be explained hereinlater, comes into contact with the contacting surfaces 8, the positioning between the head drum and the tape cassette 1 is executed.

Pinch rollers 9 are rotatably supported in positions which are between the head drum inserting concave portion 7 and each of the tape exits 6. Subguides 10 are provided at positions which are between the tape exits 6 side and the contacting surfaces 8 of the head drum inserting concave portion 7. The subguides 10 are located closer to the sides of the front surface opening edges than the contacting surfaces 8.

The magnetic tape 4 extends across the front surface portion of the cassette casing 2 in a state in which the tape 4 is wrapped around the pinch rollers 9 and transverses the front surface of the head drum inserting concave portion 7. The surface of the magnetic tape 4 which transverses the front side of the head drum inserting concave portion 7 is a tape reeving surface. The subguides 10 are located slightly on the inside of the tape reeving surface.

The front lid 11 is made of a synthetic resin having elasticity and is formed by integrally forming a cover portion 11a which covers the front surface of the cassette casing 2 and side members 11b which are projected backward from both edges of the cover portion 11a. Front edge portions of the side members 11b are rotatably supported to both right and left end walls of the cassette casing 2 and are rotated between a closing position shown in FIG. 5A and either open position shown by a solid line in FIG. 5B or an alternate open portion shown is long and two short dashes line in FIG. 5B.

A distance from a rotational fulcrum of the front lid 11 to the upper or lower edge of the front surface of the cassette casing 2 is slightly larger than an interval from the rotational fulcrum to the cover portion 11a when they are seen from the side position. Therefore, when moving between the above two positions, the cover portion 11a receives a force such that it is stretched outward when the cover portion 11a passes around the upper or lower edge of the front surface of the cassette casing 2. Thus, since the whole body of the cover portion 11a is wrapped like a gentle arc, the cover portion 11a can pass through the upper or lower edge of the front surface of the cassette casing 2. In the closed position, the cover portion 11a is clicked and locked into such a position.

b) Tape Player b-1 Outline

Figure 6:
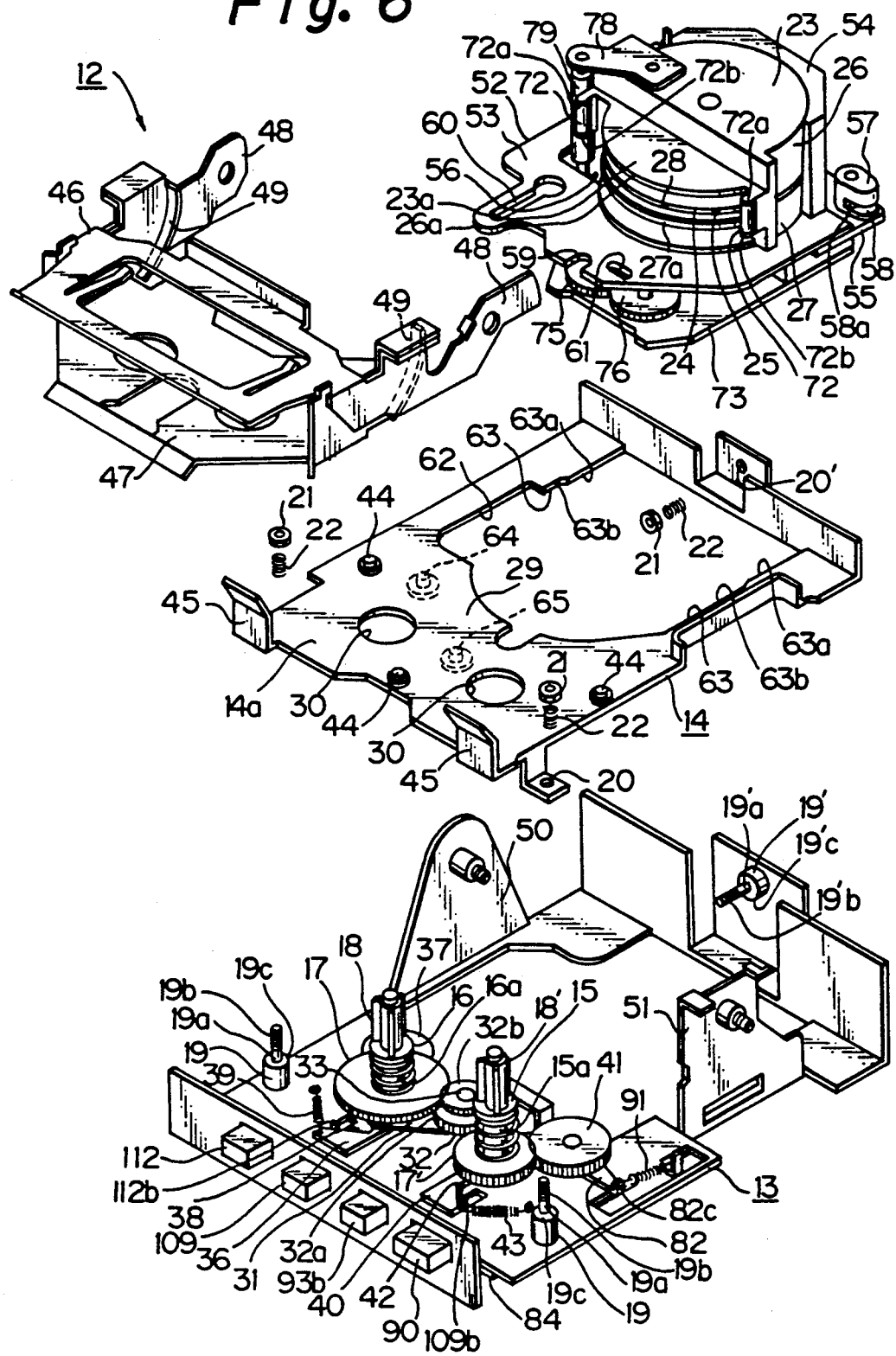
FIG. 6 is an exploded perspective view of the tape player.

A tape player is generally indicated at 12 in FIG. 6 and has a main chassis 13. A subchassis 14 is fixed to the main chassis 13.

Reel bases 15 and 16 are rotatably arranged at a position near the front side of a bottom plate portion of the main chassis 13 so as to be away from each other to the right and left. The reel bases 15 and 16 have reel base gears 17 and 17' and reel engaging shafts 18 and 18'. The reel base gears 17 and 17' and the reel engaging shafts 18 and 18' are frictionally coupled together. When the reel base gears 17 and 17' are rotated by a driving system, which will be explained hereinafter, the reel engaging shafts 18 and 18' are rotated by frictional forces which act between the shafts 18 and 18' and the reel base gears 17 and 17'.

The subchassis 14 is supported on the main chassis 13 in a position above the bottom plate portion of the main chassis 13 so as to be arranged in parallel with the bottom plate portion.

Two supporting pins 19 are provided at proper positions on the main chassis 13. Each pin 19 has a tip portion 19a of a small diameter to form a shoulder portion 19c spaced from the plate of the chassis 13. Each tip 19a has a thread portion 19b.

Reference numerals 20 denote supporting holes formed in the subchassis 14. The small diameter portions 19a of the supporting pins 19 are inserted into the supporting holes 20. Edge portions of the supporting holes 20 of the subchassis 14 are mounted on the shoulder portions 19c which are continuous contact with base edges of the small diameter portions 19a of the supporting pins 19. Stop nuts 21 are threadably attached to the threaded portions 19b of the tip portions of the small diameter portions 19a.

Compression coil springs 22 are telescopically inserted onto the small diameter portion 19a between the subchassis 14 and the stop nuts 21. The subchassis 14 is pressed to the shoulder portions 19c of the supporting pines 19 by the elastic spring forces of the compression coil springs 22.

Since the subchassis 14 is pressed to the main chassis 13 by the elastic spring forces of the compression coil springs 22 as mentioned above, even if the distortion occurred in the main chassis 13 by some stress which was applied to a mechanical chassis, the distortion is not directly propagated to the subchassis 14. Therefore, a surface accuracy of the subchassis 14 can be easily maintained.

The front portion of the subchassis 14 is used as a cassette loading portion into which the tape cassette 1 is loaded.

A head drum 23 is supported on the upper surface of the subchassis 14 so as to be movable in the front and back directions.

The head drum 23 is of the middle drum rotating type. Magnetic heads 25 (FIG. 15) are supported on an outer peripheral surface portion of a middle drum 24 and are located in a gap 28 formed between upper and lower drums 26 and 27. In a front portion 23a of the head drum 23, an interval between the upper surface of the upper drum 26 and the lower surface of the lower drum 27 is slightly smaller than an upper/lower width of the head drum inserting concave portion 7 of the tape cassette 1. On the other hand, in the front portion 23a, confronting edges 26a and 27a (FIG. 15), which are slightly outwardly projected, are formed on the upper edge of the upper drum 26 and the lower edge of the lower drum 27. An interval between the confronting edges 26a and 27a is slightly larger than the width of the magnetic tape 4.

Figure 9:
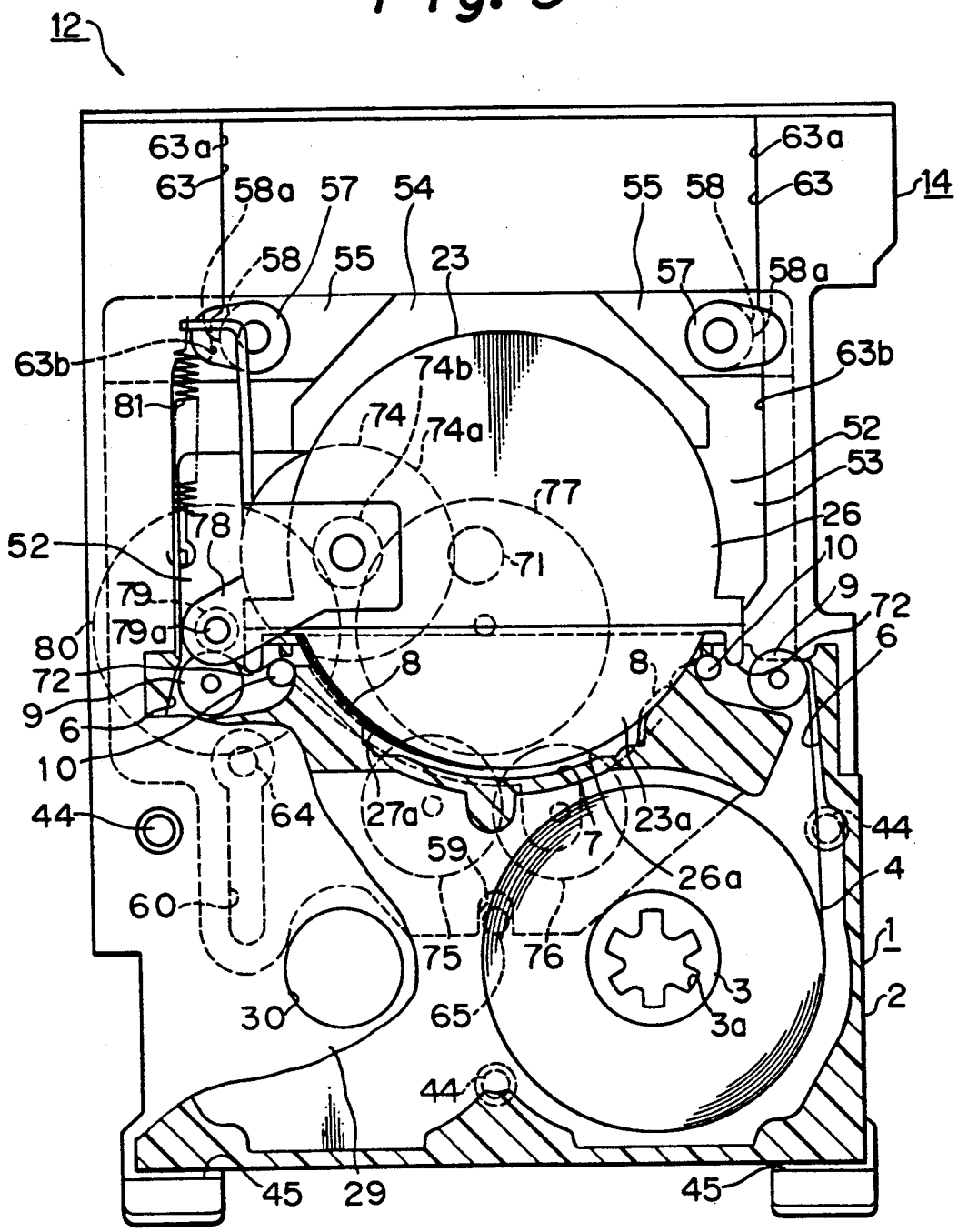
FIG. 9 is a plan view with portions cut away showing a state in which a head drum is located at a first position.
Figure 10:
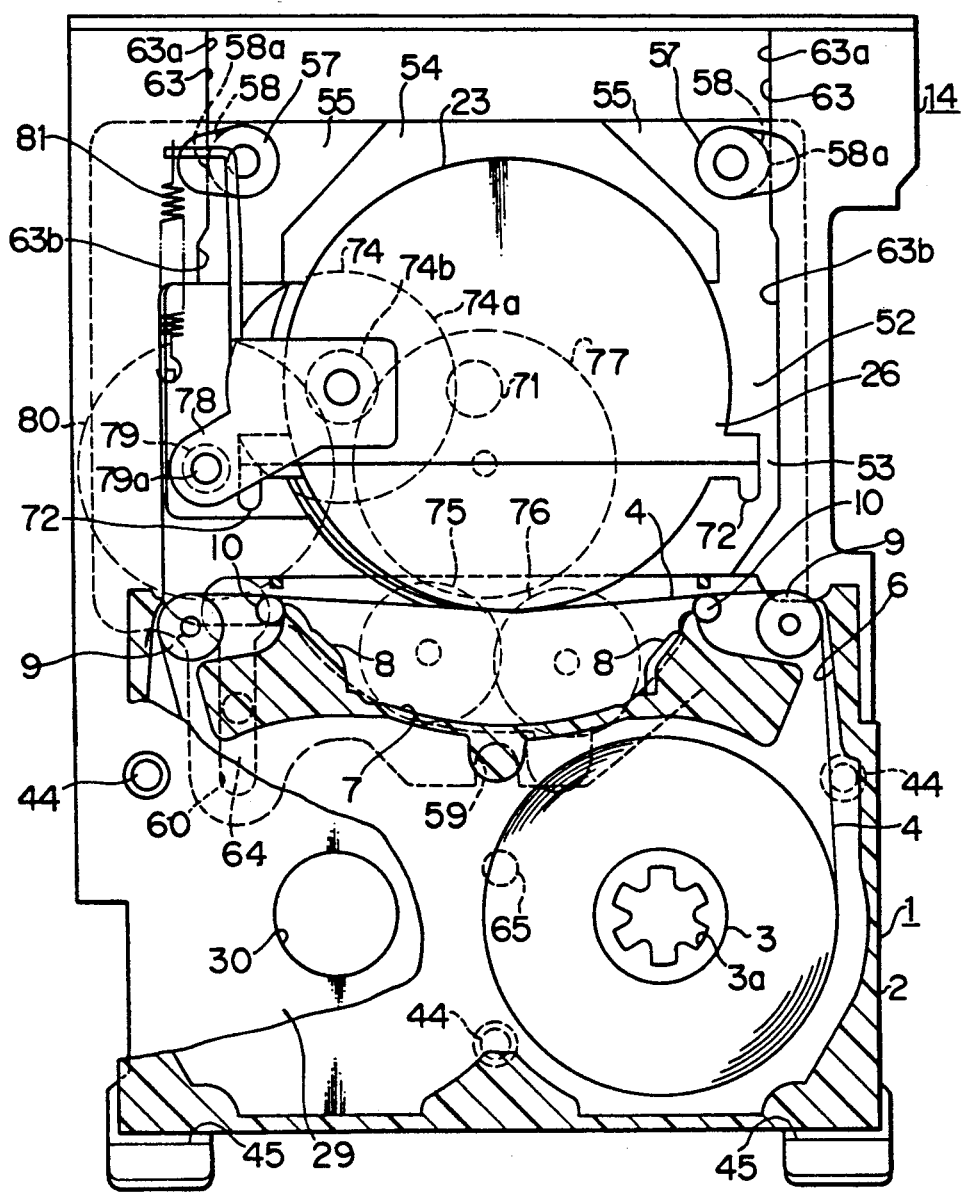
FIG. 10 is a plan view with portions cut away showing a state in which the head drum is located at a second position.
Figure 11:
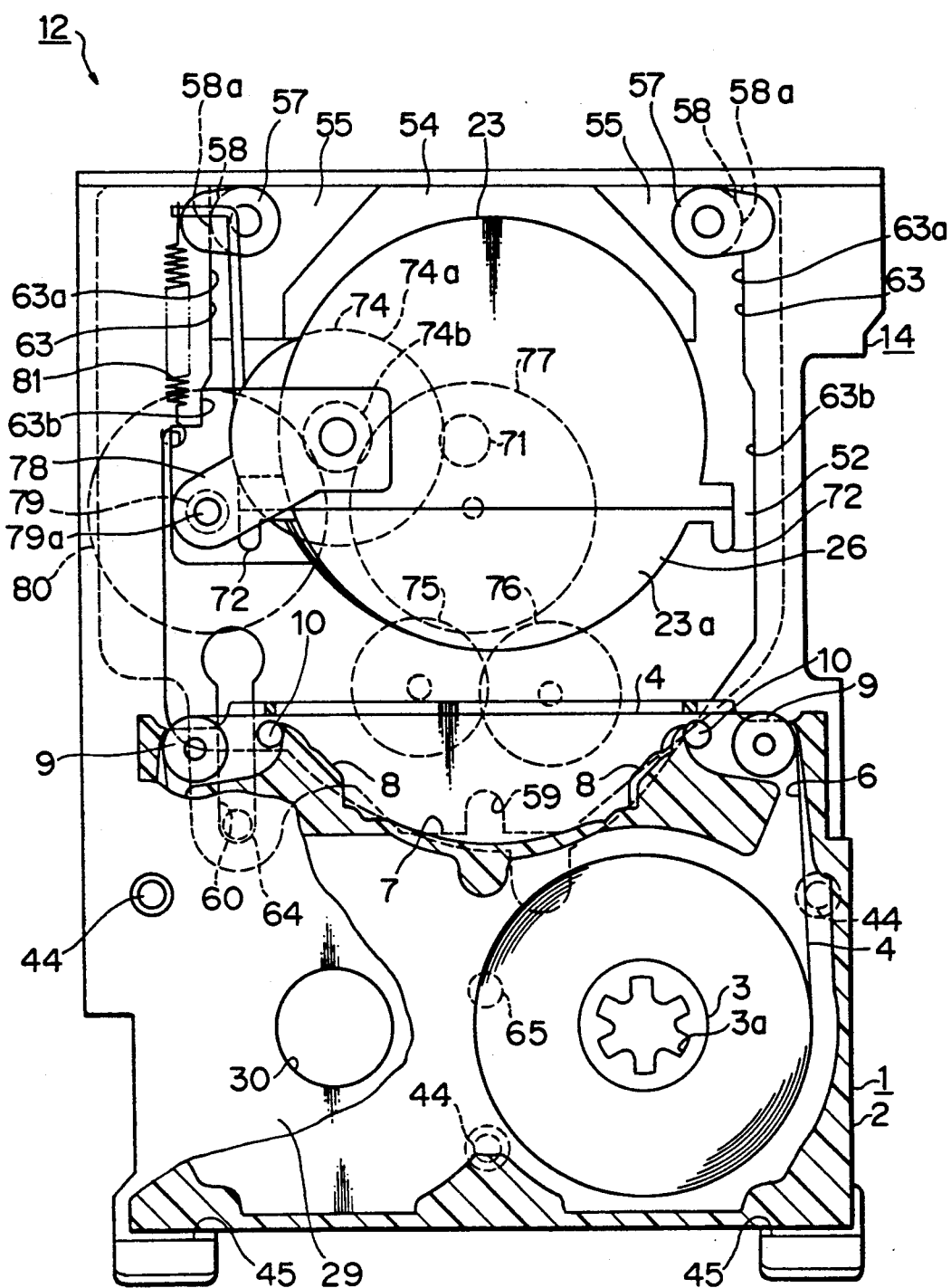
FIG. 11 is a plan view with portions cut away showing a state in which the head drum is located at a third position.

The head drum 23 can move between a first position at which most of the front portion 23a has been inserted into the head drum inserting concave portion 7 of the tape cassette 1, as shown in FIG. 9; a second position at which the front portion 23a has slightly been inserted into the head drum inserting concave portion 7, as shown in FIG. 10; and a third position at which the head drum 23 is completely out of the head drum inserting concave portion, as shown in FIG. 11.

When the head drum 23 moves to the first position, the magnetic tape 4 is pushed into the head drum inserting concave portion 7 and is wrapped around the head drum 23 at a predetermined wrap angle. In this state, both the recording and reproduction for the magnetic tape 4 can be executed by the magnetic heads 25.

When the head drum 23 moves to the second position, the magnetic tape 4 is wrapped around the head drum 23 at a wrap angle smaller than that in the case of the recording and/or reproduction mentioned above. In this state, any one of the fast forward feeding, rewinding, and searching operations of the magnetic tape 4 can be selectively executed.

When the tape cassette 1 is to be taken out or removed, the head drum 23 is moved to the third position.

b-2 Cassette Loading Portion

The upper surface of most of the front half portion of the subchassis 14 is used as a cassette loading portion 29.

Through holes 30 are formed in a front portion 14a of the subchassis 14 with an interval in the right and left directions. The reel engaging shafts 18 and 18' of the reel bases 15 and 16 are upwardly projected into the portion over the subchassis 14 via the through holes 30.

A play gear arm 31 (see FIGS. 6, 8 and 16) has a base end portion rotatably supported to a supporting shaft 16a of the reel base 16. A play gear 32 is rotatably supported on an outer end portion of the arm 31. The play gear 32 is constructed by integrally forming a large gear 32a and a small gear 32b. The small gear 32b is always in engagement with the reel base gear 17 of the reel base 16.

A lower end of a supporting shaft 33 of the play gear 32 extends downwardly to a portion below the main chassis 13 and passes through a restricting hole 34 (FIG. 16) formed in the main chassis 13. The restricting hole 34 is formed like an arc which uses the supporting shaft 16a as a center, so that a rotating range or angle of movement of the arm 31 is restricted.

A tension spring 35 extends between the play gear arm 31 and the main chassis 13. A rotating force in the counterclockwise direction when it is seen from the upper position is applied to the play gear arm 31 by the tension spring 35. Therefore, so long as the outer end portion of the play gear arm 31 is not pressed from the rear side, the play gear arm 31 is held at the position where the lower end portion of the supporting shaft 33 is in contact with the rear edge of the restricting hole 34.

Figure 8:
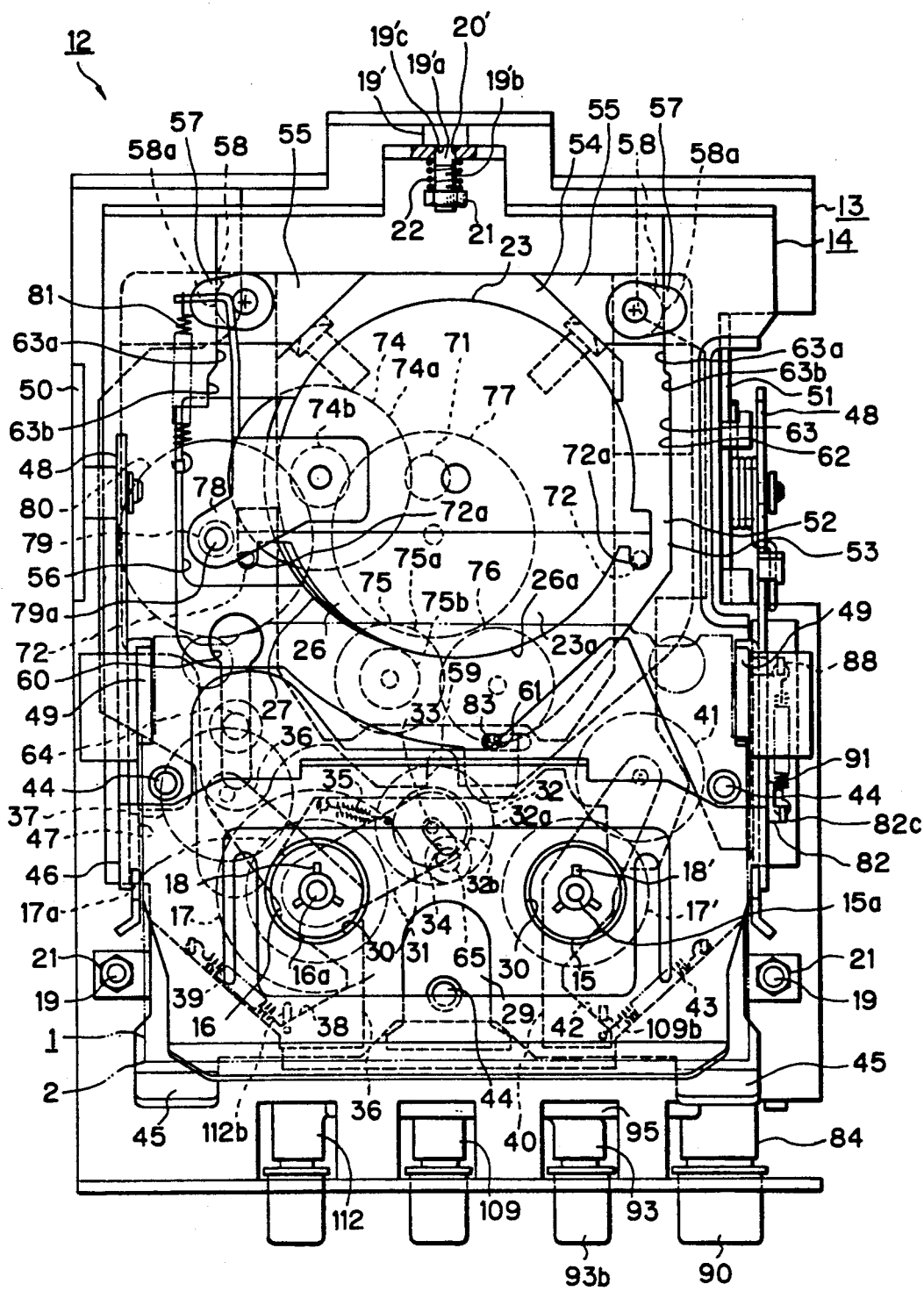
FIG. 8 is a top plan view of the whole apparatus.
Figure 16:
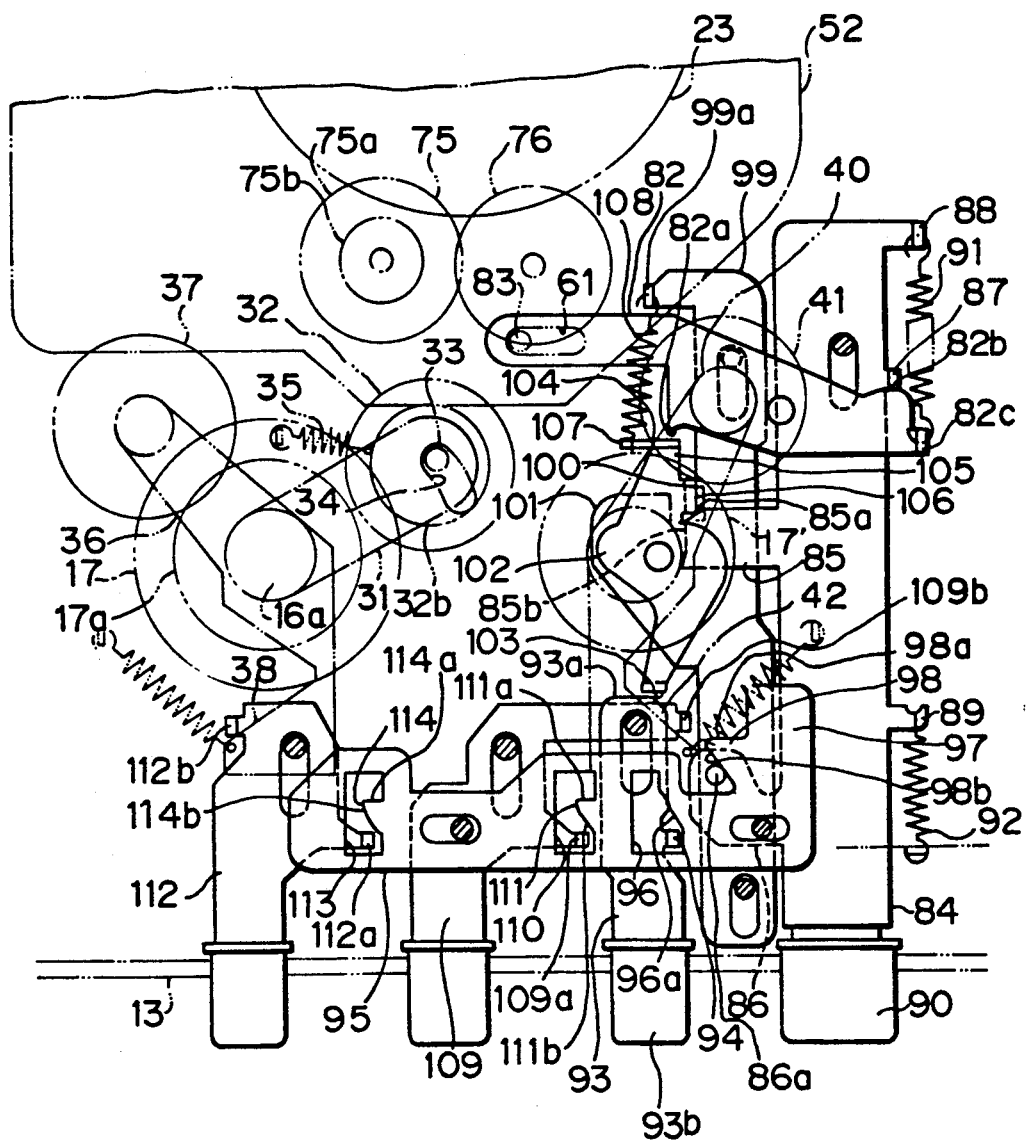

A fast forward (FF) gear arm 36 has an intermediate portion, which is rotatably supported by the supporting shaft 16a (see FIGS. 8 and 16). An FF gear 37 is rotatably supported on a rear outer end portion of the arm 36. The FF gear 37 is always in engagement with a small gear 17a of the reel base gear 17. A cam edge 38, which slants to the left and to the front as is extend toward the front end, is formed on the left side edge of the front end portion of the FF gear arm 36.

A tension spring 39 extends between the FF gear arm 36 and the main chassis 13. A rotating force in the clockwise direction, when it is seen from the upper position, is applied to the FF gear arm 36 by the tension spring 39.

An REW gear arm 40 (FIGS. 6, 7 and 8) has an intermediate portion that is rotatably supported by a supporting shaft 15a of the reel base 15. An REW gear 41 is rotatably supported on a rear end portion of the arm 40. The REW gear 41 is always in engagement with the reel base gear 17'. A cam edge 42, which slants to the frontward and right as it extends toward the front end, is formed on the right side edge of a front end portion of the REW gear arm 40.

A tension spring 43 extends between the REW gear arm 40 and the main chassis 13. A rotating force in the counterclockwise direction, when it is seen from the upper position, is applied to the REW gear arm 40 by the tension spring 43.

The arms 36 and 40 are rotated by operating an operation lever, which will be explained hereinafter, so that an FF mode, a search mode, and an REW mode to rotate the reel bases 15 and 16 at a high speed are formed.

Cassette supporting pins 44 are vertically formed on the subchassis 14. The tape cassette 1 is mounted onto the upper surfaces of the cassette supporting pins 44, so that the tape cassette 1 is positioned in the vertical direction.

Restricting members 45 are bent vertically and upwardly from both of the right and left edge portions of the front edge of the subchassis 14. The rear surface of the tape cassette 1 loaded into the cassette loading portion 29 (the front/back directions of the tape cassette 1 in a state in which it was loaded into the tape player are opposite to the front/back directions of the tape player) abuts on the restricting members 45, so that the tape cassette 1 is positioned in the front/back directions.

A cassette holder 46 is constructed by integrally forming a cassette holding portion 47 which is flat and long-quadrangular when it is seen from the front side and has two arms 48 which are projected from the rear edges of both side walls of the cassette holding portion 47 toward the rear side.

Lid opening edges 49 project from the inner surfaces of the rear edge portions of both side walls of the cassette holding portion 47. The lid opening edges 49 are formed like an arc which starts from the lower edge and curves upwardly as it advances to the rear side.

Figure 12:
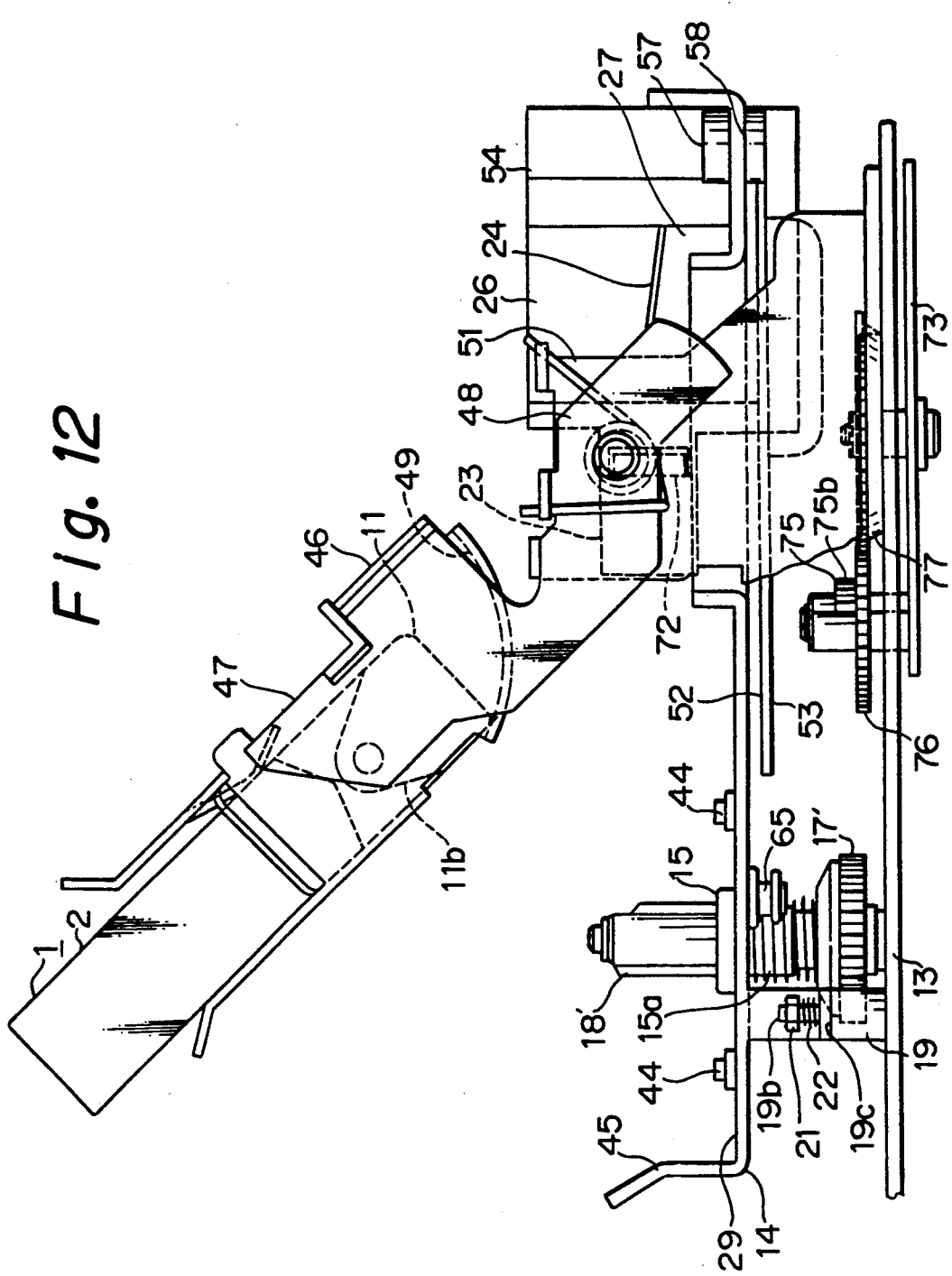
FIG. 12 is a side elevational view of the main section showing a state in which a cassette holder is located at an ejecting position.
Figure 13:
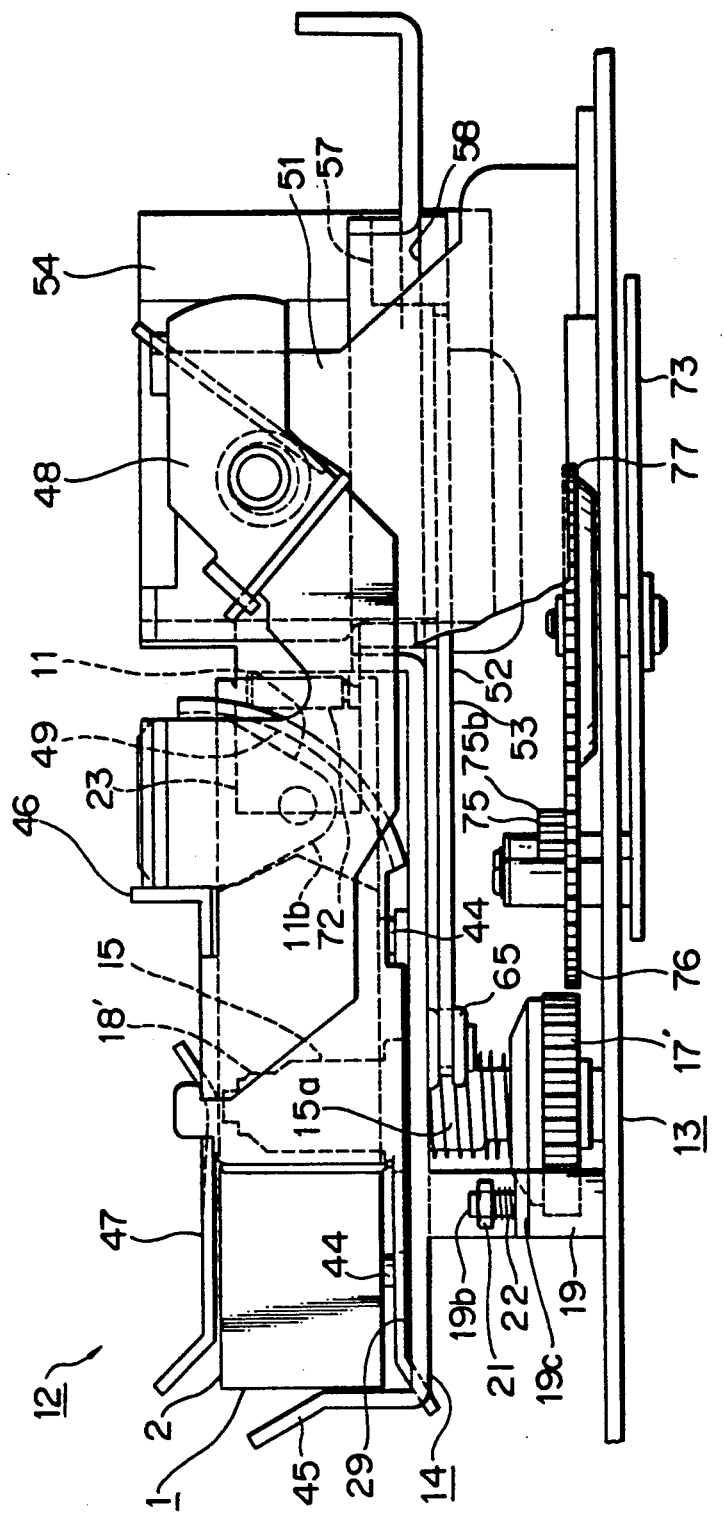
FIG. 13 is a side elevational view of the main section showing a state in which the cassette holder is located at a cassette loading position.
Figure 14A:
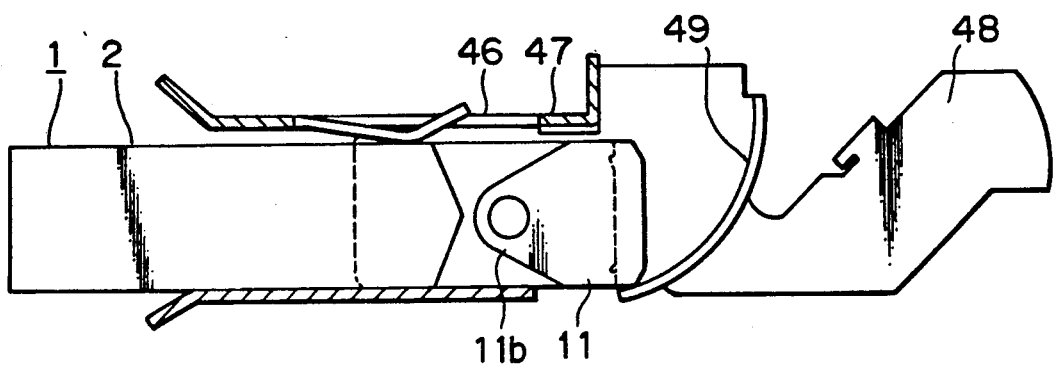
FIGS. 14A–14F are side elevational views with portions cut away showing different stages or states in which a tape cassette is inserted into the cassette holder and a lid is opened and, thereafter, the tape cassette is ejected out of the holder.
Figure 14B:
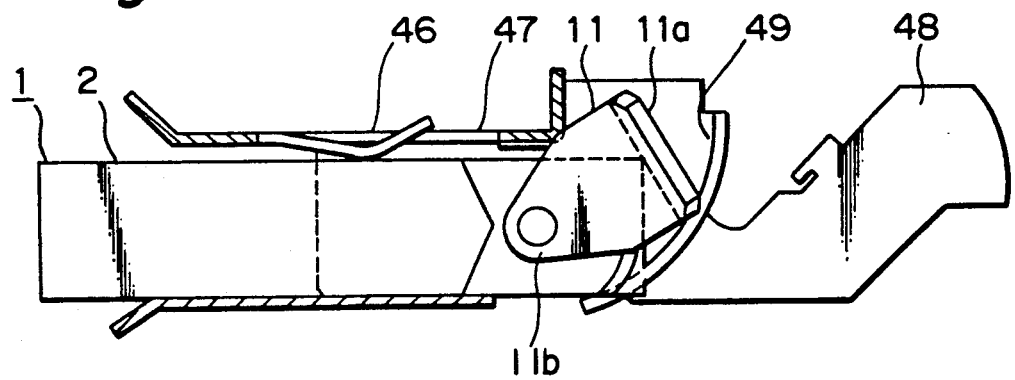
Figure 14C:
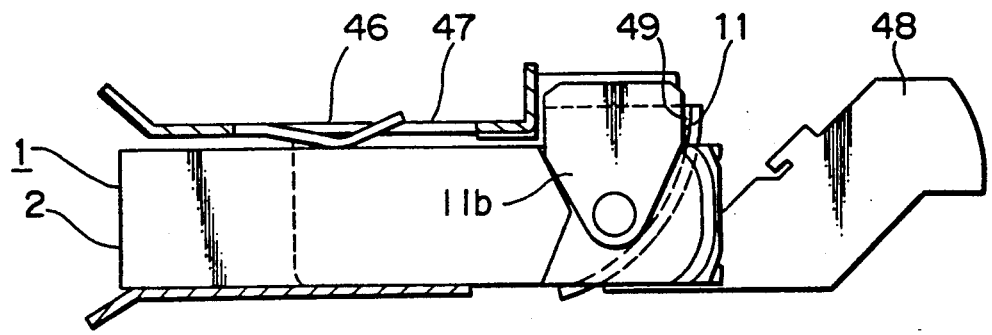
Figure 14D:
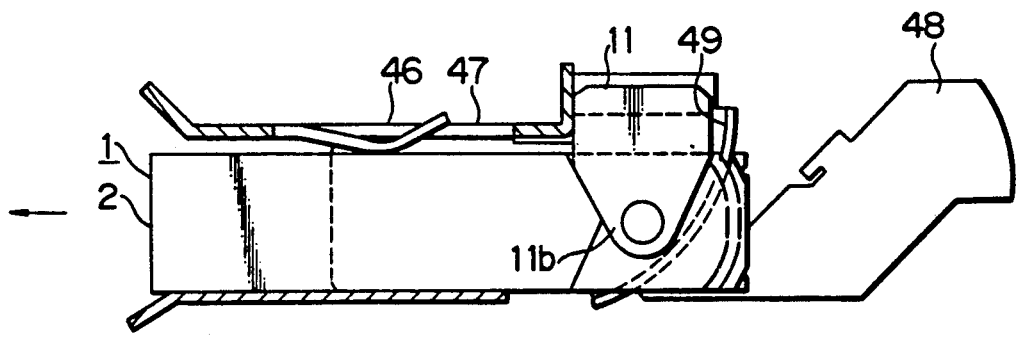
Figure 14E:
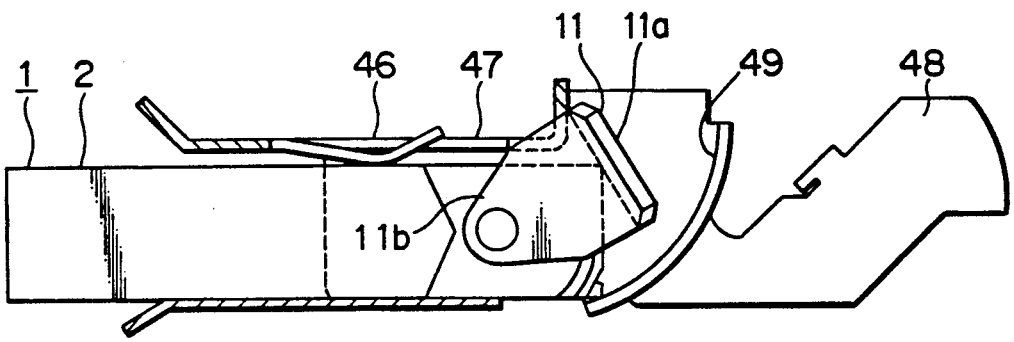
Figure 14F:
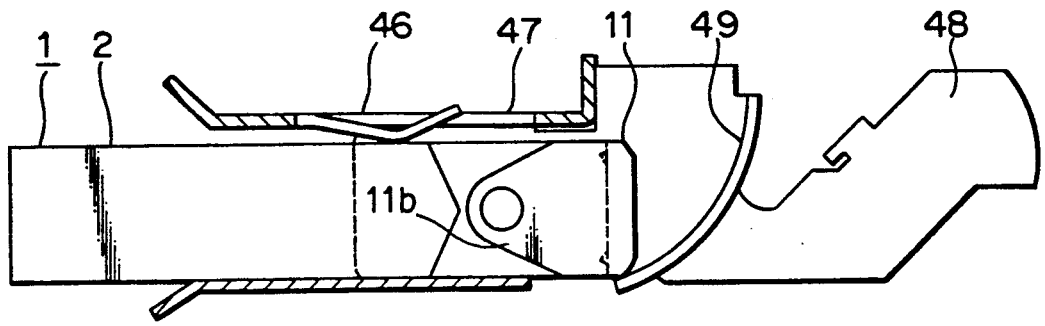
Figure 15:
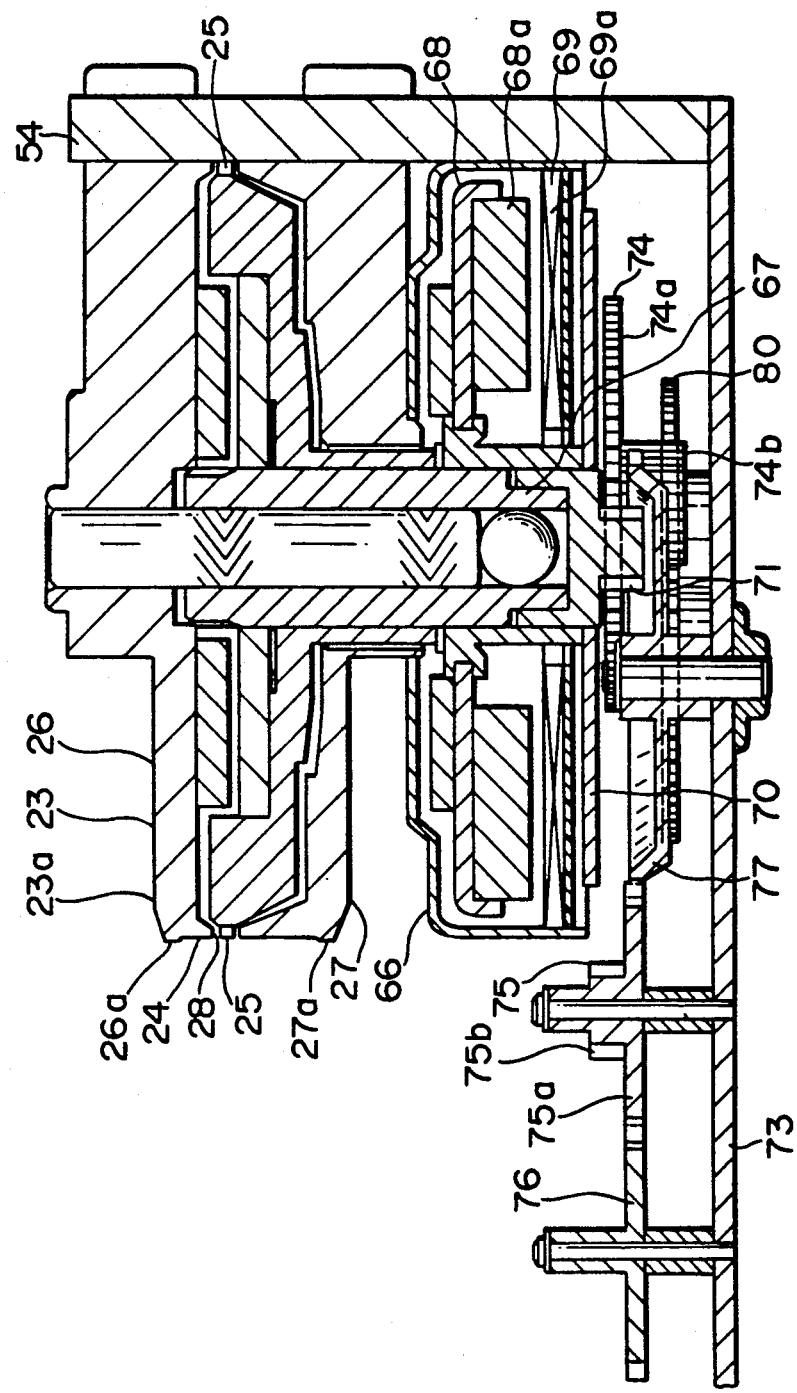
FIG. 15 is a vertical cross sectional view of the head drum in a state in which gears over a gear base were developed.

The arms 48 of the cassette holder 46 are rotatably supported on supporting walls 50 and 51 which project from the main chassis 13, so that the cassette holder 46 can be moved between an ejecting position shown in FIG. 12 and a loading position shown in FIG. 13.

When the tape cassette 1 is inserted into the cassette holding portion 47 of the cassette holder 46 while in an ejecting position, both end portions of the portion of the lower side of the front lid 11 come into contact with the lid opening edges 49. When the tape cassette 1 is further inserted into the cassette holding portion 47 from the above contacting position, both edge portions of the front lid 11 will be pivoted upward by the lid opening edges 49 to the open position. When the front lid 11 has reached the open position, the front edge of the top plate of the cassette holding portion 47 faces the front lid 11 in an almost contacting state. Therefore, when the tape cassette 1 is pulled out of the cassette holding portion 47, the front lid 11 is relatively depressed by the front edge of the top plate of the cassette holding portion 47 and is returned to the closed position.

As mentioned above, when the cassette holder 46 in a state in which the tape cassette 1 was inserted into the cassette holding portion 47, it is downwardly rotated and the tape cassette 1 is loaded into the cassette loading portion 29. That is, the reel engaging shafts 18 and 18' of the reel bases 15 and 16 come into engagement with the engaging holes 3a of the tape reels 3 of the tape cassette 1. The surface of the lower side of the cassette casing 2 is put on the upper end surfaces of the cassette supporting pins 44.

b-3 Supporting of the Head Drum

A head base 52 (FIG. 6) is supported on the subchassis 14 so as to be movable in the front and rear directions.

The head base 52 comprises a slide plate 53 and a supporting block 54 fixed to the slide plate 53. Coupling members 55 are outwardly projected from almost central portions in the vertical direction of both of the right and left side surfaces of the supporting block 54.

A large notch 56, which is opened toward the rear side, is formed in the slide plate 53. Both of the right and left edge portions of the rear end portion of such a slide plate 53 are fixed to the coupling members 55 of the supporting block 54.

Slide bridges 57 are fixed to the upper surfaces of the coupling members 55 and are made of a synthetic resin having a good slipping performance. Slide grooves 58, which are opened toward the outside, are formed on the slide bridges 57.

A slit 59 is formed at the center of the front edge of the slide plate 53 and extends in the front/rear direction and is opened to the front edge. An elongated guide hole 60 is likewise formed in the front edge portion of the slide plate 53 and extends in the front/rear direction. An elongated engaging hole 61 is positioned near the front edge of the slide plate 53 and extends in the right-/left direction.

A hole 62, which occupies a large part of the rear half portion of the subchassis 14 is formed in the subchassis 14. Both side edges 63 of the hole 62 are used as guide edges and extend in the front/rear direction and are set to be in parallel. Rear edge portions 63a of the guide edges 63 project slightly inwardly. A distance between the rear edge portions 63a is almost equal to a distance between interior surfaces or bases 58a of the slide grooves 58 formed on the slide bridges 57. A distance between portions 63b of the guide edges 63 from which the rear edge portions 63a were eliminated is slightly larger than the distance between the interior surfaces 58a of the slide grooves 58.

The slide grooves 58 of the head base 52 are slidably engaged with the guide edges 63 of the subchassis 14. A guide pin 64 attached on the subchassis 14 is slidably engaged with the long guide hole 60 of the head base 52. In addition, a guide pin 65, which is attached on the subchassis 14, is likewise slidably engaged with the slit 59 of the head base 52. Thus, the head base 52 is supported on the subchassis 14 so as to be movable in the front/rear direction.

When the slide grooves 58 are in engagement with the rear edge portions 63a of the guide edges 63, the guide edges 63a are sey into a state in which they are substantially in contact with the interior bases 58a of the slide grooves 58. Thus, the head base 52 is held in a state in which there is hardly any oscillation in the right and left direction. However, when the slide grooves 58 are in engagement with the portions 63b of the guide edges 63, small gaps exist between the portions 63b and the interior bases 58a of the slide grooves 58, so that the head base 52 can slightly oscillate to the right and left.

The head drum 23 is fixed to the head base 52 as mentioned above. The head drum 23 is a head drum of the type in which a motor is integrally assembled. The head drum 23 has a drum motor 60 (see FIG. 19).

A middle drum 24 and a rotor 68 are fixed to a rotational shaft 67, respectively. A rotor magnet 68a is fixed to the rotor 68. A stator 69 is arranged so as to face the rotor magnet 68. A stator coil 69a is supported so as to face the rotor 68a. A back yoke 70 is fixed to the rotational shaft 67 so as to face the rotor 68 through the stator 69. A driving gear 71 is integrally formed with the lower end of the rotational shaft 67 which projects downwardly from the lower edge of the motor 66.

As best illustrated in FIG. 6, tape guides 72 are fixedly positioned on the slide plate 53 of the head base 52 so as to be located on both sides of the head drum 23. Restricting flanges 72a and 72b are formed in both of the upper and lower end portions of the tape guides 72, respectively. The distances between the restricting flanges 72a and 72b are set to be almost equal to the width of the magnetic tape 4. The restricting flanges 72a and 72b are provided on the head base 52 in a state in which their positional relation is strictly fixed to the head drum 23 in a manner such that the positional relation with the head drum 23 is fixed.

Figure 7:
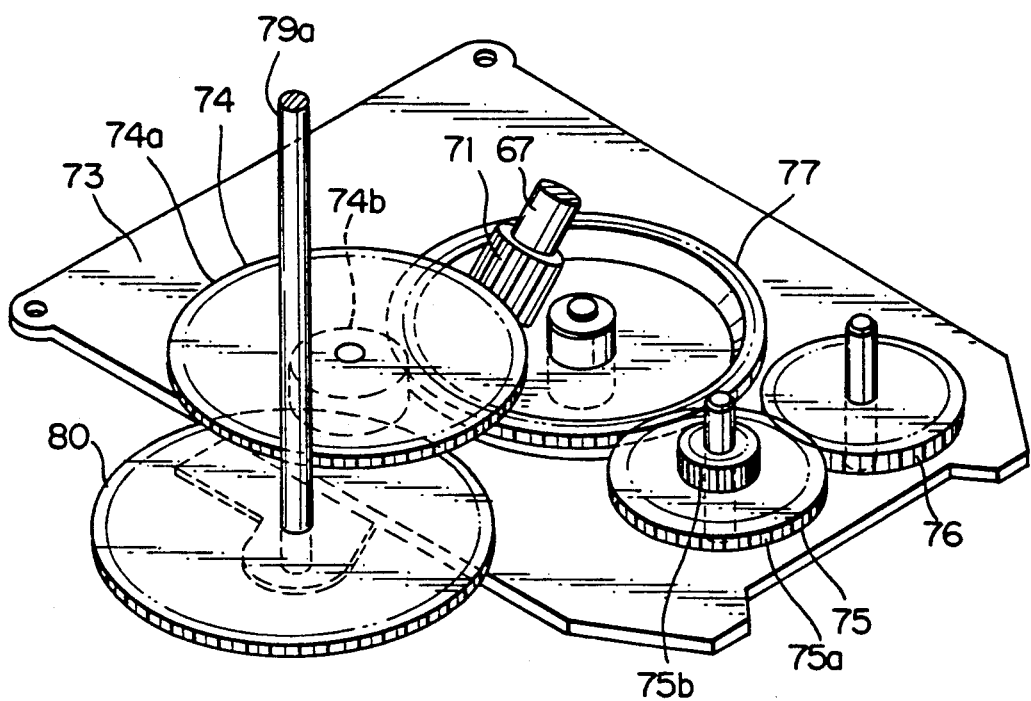
FIG. 7 is a perspective view of a gear base.

FIGS. 6 and 7 illustrate a gear base 73 whose rear edge portion is fixed to the lower edge portion of the supporting block 54 of the head base 52. A transfer gear 74 is rotatably supported on the gear base 73 on the left side of the driving gear 71. The transfer gear 74 is constructed by integrally forming a large gear 74a and a small gear 74b together. The large gear 74a is in engagement with the driving gear 71.

Junction gears 75 and 76 are arranged at the left and right positions on the front edge portion of the gear base 73 and are rotatably supported in a mutually engaging state. The gear 75 relates to the FWD system and the gear 76 corresponds to the REW system. The junction gear 75 of the FWD system is constructed by coaxially forming a large gear 75a and a small gear 75b together. The large gear 75a of the junction gear 75 of the FWD system and the small gear 74b of the transfer gear 74 are linked by a link gear 77, which is rotatably supported on the gear base 73.

Therefore, when the drum motor 66 is rotated, the two junction gears 75 and 76 are rotated in the opposite directions. That is, when they are seen from the upper position, the junction gear 75 of the FWD system is rotated counterclockwise and the junction gear 76 of the REW system is rotated clockwise.

A capstan arm 78 (FIG. 6) has a base edge portion that is rotatably supported on the gear base 73 and the upper drum 26 and whose rotational shaft is coaxial with a rotational shaft of the transfer gear 74.

A capstan 79 is rotatably supported on a rotational edge portion of the capstan arm 78. A capstan gear 80 (FIG. 7) is fixed to a shaft 79a which extends below the capstan 79. The capstan gear 80 is in engagement with the small gear 74b of the transfer gear 74. Therefore, when the drum motor 66 rotates, the capstan 79 is rotated.

A tension spring 81 extends between the capstan arm 78 and the head base 52 (FIG. 9). A counterclockwise rotating force is applied to the capstan arm 78 by the tension spring when it is seen from the upper position.

In a state in which the head base 52 progressed ahead and the head drum 23 is set to the first position (FIG. 9), the slide grooves 58 of the head base 52 are in engagement with the portions 63b of the guide edges 63 and can slightly oscillate to the right and left. Therefore, the head drum 23 corrects its position by itself during the process so that the confronting edges 26a and 27a of the head drum 23 are pressed onto the contacting surfaces 8 of the tape cassette 1. Therefore, so long as the accuracies of the contacting surfaces 8 of the tape cassette 1 are high, the relative position between the magnetic tape 4 and the head drum 23 is accurately specified.

During the process with the head drum 23 being moved to the first position, the capstan 79 comes into contact with the magnetic tape 4 and holds the tape against the pinch roller 9 on the side of the cassette 1 which has a tape reel 3 in engagement with the reel engaging shaft 18 of the reel base 16 and this is the take-up side of the tape cassette 1. For a period of time when the head drum 23 is being moved to the first position, the capstan 79 is relatively slightly moved backward and the tension spring 81 is slightly stretched. Therefore, the capstan 79 comes into pressure contact with the pinch roller 9 through the magnetic tape 4 by the elastic spring force which was accumulated by the stretching of the tension spring 81.

On the other hand, when the head drum 23 has reached the first position, the tape guides 72 located at both sides of the head drum enter the portions between the pinch rollers 9 of the tape cassette 1 and the subguides 10, so that the magnetic tape 4 is wrapped around the tape guides 72. Since the magnetic tape 4 was wrapped around the tape guides 72, the position in the vertical direction of the tape is restricted between the restricting flanges 72a and 72b of the tape guides 72. The tape 4 is conveyed in this state. Therefore, if the positional relation between the head drum 23 and the tape guides 72 is accurately set, the relative position of the magnetic tape 4 for the head drum 23 is strictly specified. Moreover, since it is unnecessary to slide one side edge of the magnetic tape 4 along the leads which have conventionally been used, it becomes difficult to cause a damage to the magnetic tape 4.

b-4 Operating Mechanism

A head moving lever 82 (FIGS. 6, 8 and 16) is formed so as to be long in the right/left direction. An almost intermediate portion of the lever 82 is rotatably supported to the main chassis 13.

A coupling pin 83 (FIGS. 8 and 16) is vertically attached on a left end portion of the head moving lever 82. The coupling pin 83 is slidably engaged with the elongated engaging hole 61 of the head base 52. Therefore, when the head moving lever 82 is rotated, the coupling pin 83 is moved almost in the front/rear direction, so that the head base 52, i.e., the head drum 23 is moved in the front/rear direction.

A portion 82a (FIG. 16) to be pressed is formed at a position of the front edge of the head moving lever 82 which is deviated to the left side of a rotational fulcrum of the head moving lever 82. On the other hand, a rear edge 82b of the right end portion is used as a stopper edge. Further, a spring hook member 82c is formed at the right end of the lever 82.

A play lever 84 is supported on the main chassis 13 so as to be slidable in the front/rear direction. A pressing member or lateral arm 85 is projected from an almost intermediate position in the front/rear direction of the play lever 84 toward the left. The left edge of the rear side edge of the pressing member 85 is used as a pressing edge 85a which is inclined so as to be deviated toward the front side as it approaches the left side. On the other hand, a left side edge 85b is used as a holding edge which extends in the front/rear direction.

An arm member 86 projects from a position closer to the front end of the play lever 84 toward the left side. A locking pin 86a extends vertically at the tip portion of the arm member 86.

A stopper member 87 is vertically provided at a position closer to the rear end of the right side edge of the play lever 84. A spring hook member 88 projects from the rear end of the play lever 84 on the right side. A spring hook member 89 projects from the right side at a position closer to the front end of the play lever 84. A push button 90 is attached to the front end of the play lever 84.

A tension spring 91 extends between the spring hook member 82c of the head moving lever 82 and the spring hook member 82 of the play lever 84. Thus, a counterclockwise rotating force is applied to the head moving lever 82 when it is seen from the upper position. When a force to rotate the head moving lever 82 in a clockwise direction is not applied thereto, the stopper edge 82b of the head moving lever 82 comes into contact with the stopper member 87 of the play lever 84 so that the position of the head moving lever 82 is limited to a specified position.

A tension spring 92 extends between the spring hook member 89 of the play lever 84 and the main chassis 13. A forward moving force is applied to the play lever 84 by the tension spring 92.

Figure 17:
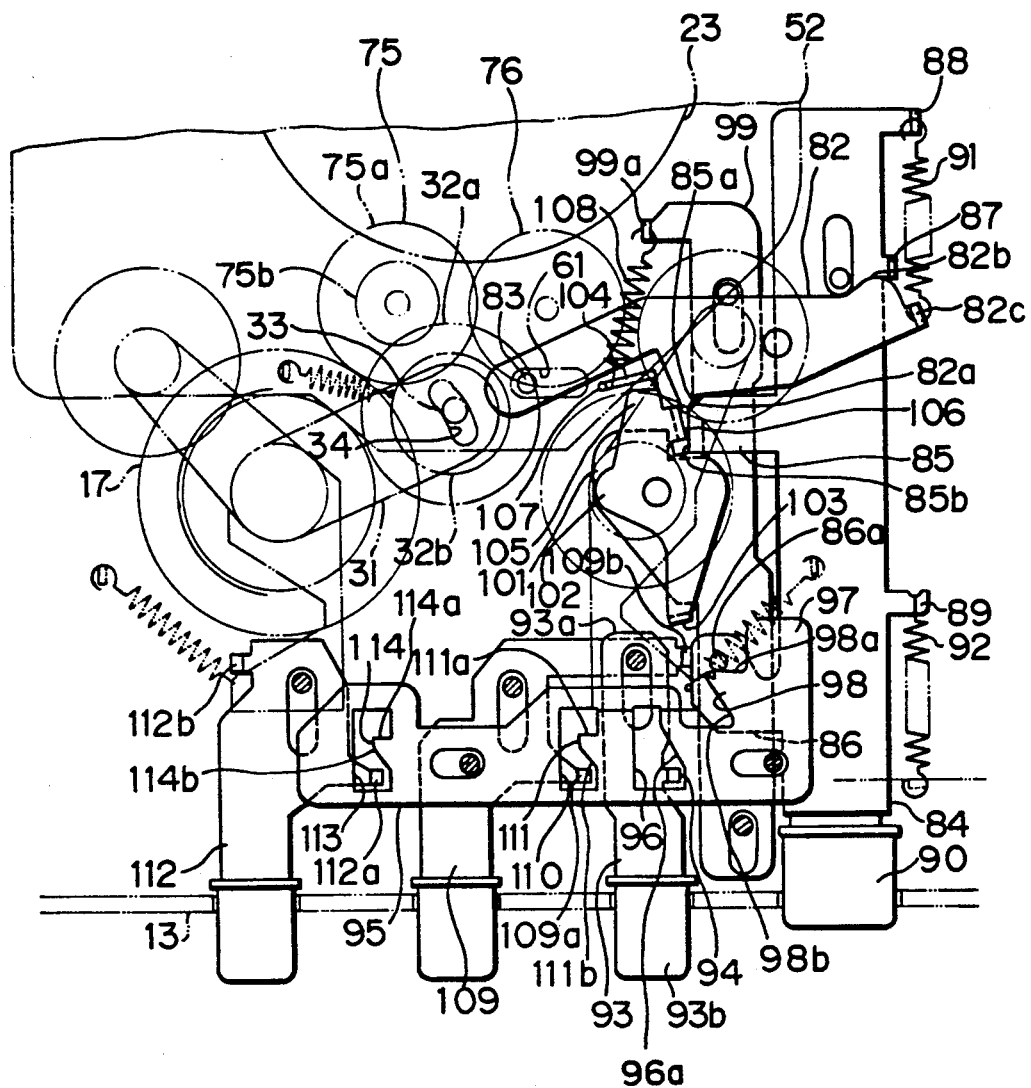
Figure 18:
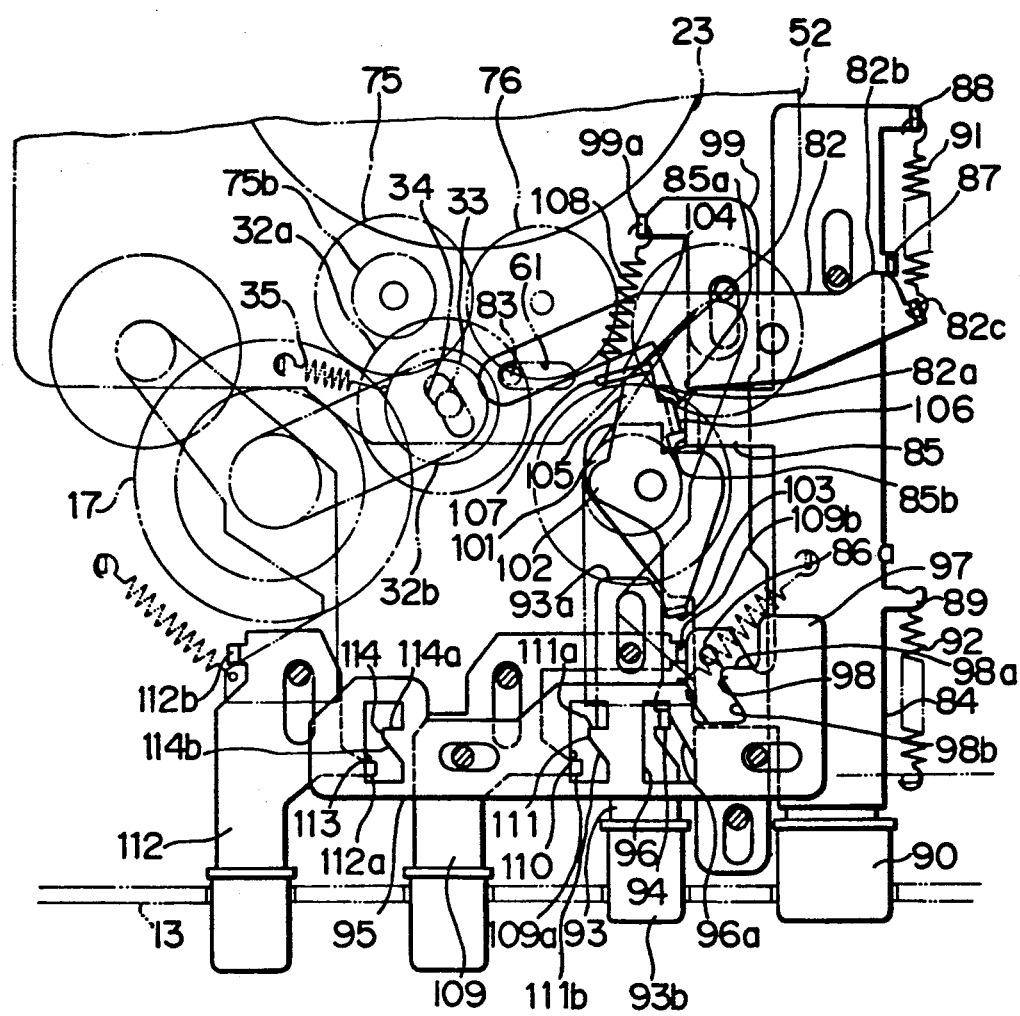
Figure 19:
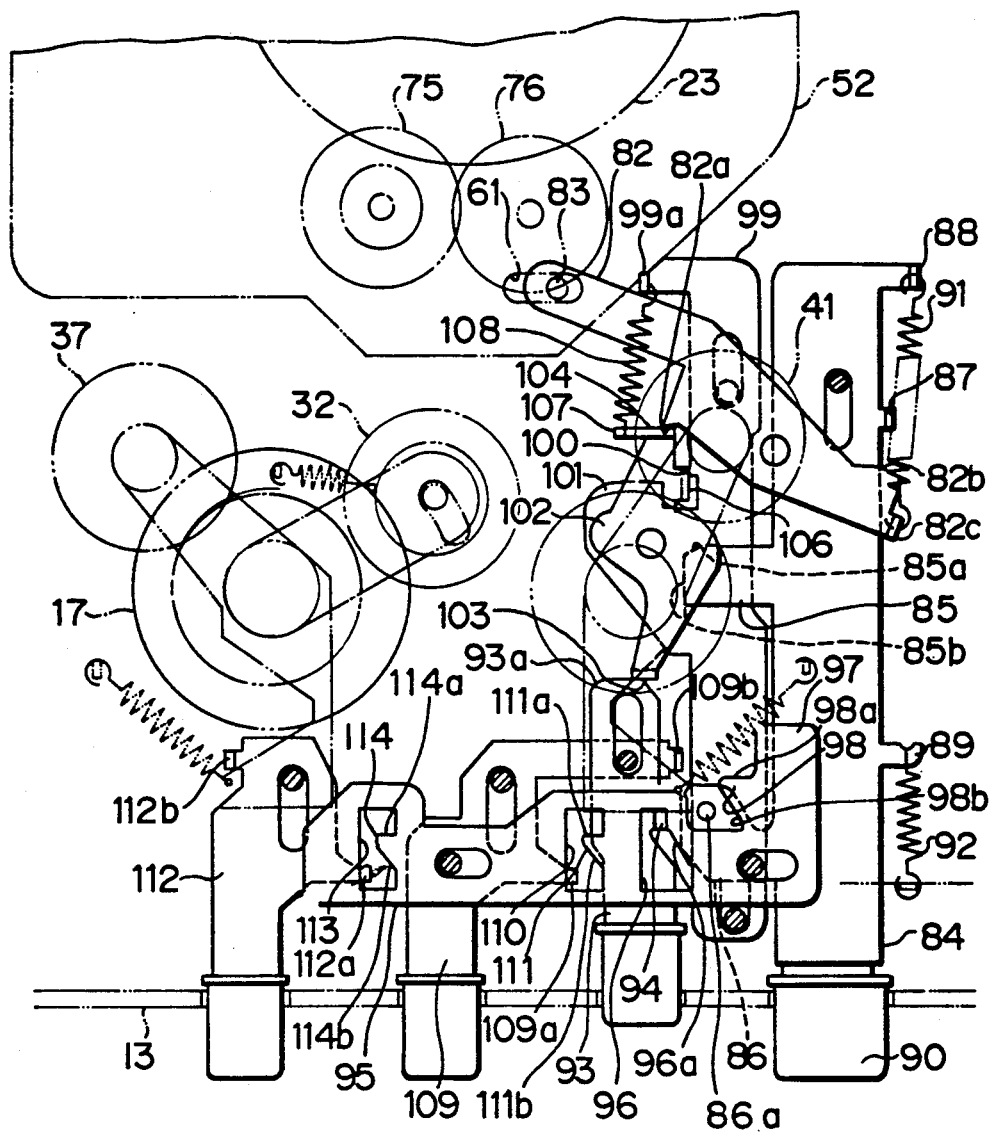

For a period of time when the play lever 84 is not depressed, the head moving lever 82 is located so as to extend in almost the right/left direction, as shown in FIG. 16, so that the head drum 23 is located at the second position. When the play lever 84 is depressed, as shown in FIG. 17, the right edge of the head moving lever 82 is stretched rearwardly by the play lever 84 through the tension spring 91. Thus, the head moving lever 82 is rotated counterclockwise when it is seen from the upper position. The coupling pin 83 is moved toward almost the front side. Therefore, the head drum 23 is moved to the first position. Until the locking state is released, the play lever 84 is held at a rearward moving position shown in FIG. 17 by a locking lever, which will be explained later, so that the head drum 23 is also held at the first position.

A stop/eject lever 93 is supported on the main chassis 13 at a position which is slightly spaced away from the lever 84 on the left side of the play lever 84 so as to be slidable in the front/rear direction. A pressing projection 94 is formed on the lever 93 to extend vertically. A forward moving force is applied to the stop/eject lever 93 by elastic spring means (not shown). A rear end 93a of the stop/eject lever 93 is used as a pressing edge. A push button 93b is attached to the front end of the stop/eject lever 93.

A locking lever 95, which is like a plate, is long in the right/left direction. The locking lever 95 is supported at a position closer to the front edge of the main chassis 13 so as to be slidable in the left/right direction. A leftward moving force is applied to the locking lever 95 by elastic spring means (not shown).

A hole 96, which is elongated in the front/rear direction, is formed at a position slightly closer to the right edge from the center of the locking lever 95. An edge 96a, which will be pressed by the projection 94, is inclined as it approaches the rear side and is formed at the right side edge of the hole 96.

The pressing projection 94 of the stop/eject lever 93 is located in the hole 96 of the locking lever 95 and is also located so as to come substantially into contact with the portion closer to the front edge of the right side edge 96a of the hole 96. When the stop/eject lever 93 is rearwardly depressed, the pressing projection 94 presses the edge 96a of the locking lever 95, so that the locking lever 95 is moved to the right against the elastic spring force which has been applied to the locking lever 95. When the stop/eject lever 93 is returned to the original position by the elastic spring force applied to the lever 93, the locking lever 95 is also moved to the left by the elastic spring force applied to the elver 95 and is returned to the original position.

A locking hook or catch 98 projects toward the left from a left side edge of a projection 97 which projects to the rear side from the right end portion of the locking lever 95. A rear edge 98a of the locking hook 98 is used as a locking edge which extends in the right/left direction. An edge 98b which forwardly extends from the left edge of the locking edge 98a is used as an edge to be pressed which is inclined so as to extend to the right as it approaches the front side.

When the play lever 84 is located at a non-pressing or non-depressed position shown in FIG. 16, the locking pin 86a is in contact with the edge 98b of the locking hook 98 at a position closer to the front side of the locking lever 95. When the play lever 84 is depressed, the pin 86a presses the edge 98b of the locking lever 95, so that the locking lever 95 is moved to the right. When the play lever 84 has reached the depressed position shown in FIG. 17, the pin 86a has moved off the edge 98b and into the edge 98a so that the locking lever 95 can be moved to the left by the elastic spring force applied to the lever 95. The edge 98a is now engaged on the front side of the pin 86a. Therefore, even if the force, which has rearwardly pressed the play lever 84, is eliminated, the pin 86a is in engagement with the rearwardly facing locking edge 98a of the locking lever 95 and the play lever 84 is locked in the depressed position.

When the stop/eject lever 93 is depressed from a state in which the play lever 84 was locked in the depressed position, the locking lever 95 is moved to the right as mentioned above, so that the locking edge 98a engaging a front side of the pin 86a of the play lever 84 escapes to the right. Consequently, the play lever 84 is released and returns to the non-pressing position by the moving force applied by the tension spring 92.

A supporting lever 99 (FIG. 16) is supported on the main chassis 13 at a position between the play lever 84 and the stop/eject lever 93 so as to be slidable in the front/rear direction. A forward moving force is applied to the supporting lever 99 by elastic spring means (not shown). A stopper edge 100 on the left side edge of the supporting lever 99 is slightly closer to the rear side than the almost central position.

A supporting member 101 projects to the left from the front end of the stopper edge 100 at an almost central position in the front/rear direction of the supporting lever 99.

A junction lever 102 has an almost central portion rotatably supported on the supporting member 101 of the supporting lever 99. The junction lever 102 extends in almost the front/rear direction. A member 103, which is to be pressed, projects downwardly at the front end of the lever 102 and a pressing member 104 projected upwardly at the rear end. On the other hand, a restricting member 106 projects downwardly from almost an intermediate position in the front/rear direction on the right side edge of a rear member portion 105 of the lever 102.

A spring hook member 107 projects to the left from the left edge of the pressing member 104 of the junction lever 102. A tension spring 108 extends between the spring hook member 107 and a spring hook member 99a formed in the rear edge portion of the supporting lever 99. Thus, a clockwise rotating force is applied to the junction lever 102 when it is seen from the upper position. Ordinarily, the restricting member 106 comes into contact with the left side surface of the stopper edge 100 of the supporting lever 99 and the position of the lever 99 is restricted to a junction position which extends in almost the front/rear direction. In a state in which the supporting lever 99 is located at the forward advancing position and junction lever 102 is set to the junction position, the pressing edge 85a of the play lever 84, while in a non-depressed position, comes into contact with the front edge of the restricting member 106 of the junction lever 102 from the right front side.

When the play lever 84 is moved to the depressed position from the above state, the pressing edge 85a presses the restricting member 106 of the junction lever 102 toward the left rear position during such a moving operation. Therefore, the junction lever 102 is rotated counterclockwise against the tension force of the tension spring 108. Further, the restricting member 106 comes into contact with the holding edge 85b of the play lever 84 in association with the rearward movement of the play lever 84 and is held in the non-junction position at which it is slightly rotated counterclockwise from the junction position.

In a state in which the junction lever 102 is held at the junction position, the member 103 closely faces the pressing edge 93a of the stop/eject lever 93 from the rear position. On the other hand, the pressing member 104 closely faces the portion 82a of the head moving lever 82 from the front side. On the other hand, in a state in which the junction lever 102 is held at the non-junction position (see FIG. 17), the member 103 is located at a position which is offset to the right from the moving locus of the pressing edge 93a of the stop/eject lever 93. On the other hand, the pressing member 104 is located at a position which is offset to the left from the moving locus of the portion 82a of the head moving lever 82.

From a state in which the play lever 84 was moved to the depressed position and the head drum 23 was moved to the first position and the recording and/or the reproducing mode were/was formed, when the stop/eject lever 93 is depressed to release the above mode, the pressing edge 93a does not press the member 103 of the junction lever 102. The locking lever 95 is moved to the right, that is, in the unlocking direction, and the play lever 84 is returned to the non-pressing position. Thus, the head drum 23 is merely returned to the second position. The junction lever 102 is returned to the junction position.

When the stop/eject lever 93 is depressed in a state in which the play lever 84 is held at the non-pressing or non-depressed position, the pressing edge 93a rearwardly presses the member 103 of the junction lever 102 in the junction position. Thus, the junction lever 102 is moved rearwardly together with the supporting lever 99. At this time, since the pressing member 104 of the junction lever 102 presses the portion 82a of the head moving lever 82 almost rearwardly, the head moving lever 82 is rotated clockwise against the stretching force of the tension spring 91 when it is seen from the upper position. Thus, the head drum 23 is moved to the third position. Then, the locking state of the cassette holder 46 by locking means (not shown) is released and the cassette holder 46 is moved to the ejecting position by elastic spring means (not shown). On the other hand, when the cassette holder 46 has reached the ejecting position, the head base 52 is locked. Accordingly, the head drum 23 is held at the third position until the cassette holder 56 is returned to the loading position.

Such a locking state for the head base 52 can be realized by various means so that, for instance, a locking hook to lock the stop/eject lever 93 in the depressed position is formed to the locking lever 95 and a cam to move the locking lever 95 in the unlocking direction is interlocked with the cassette holder 46 during the process of the movement of the cassette holder 46 to the loading position, and the like.

An REW lever 109 is supported on the main chassis 13 on the left side of the stop/eject lever 93 so as to be slidable in the front/rear direction. A forward moving force is applied to the REW lever 109 by elastic spring means (not shown). A locking member 109a and a pressing member 109b, respectively, project from the REW lever 109.

A hole 110 is formed in the locking lever 95 on the left side of the hole 96 and is long in the front/rear direction. A locking catch 111 projects toward the left at the right side edge of the hole 110. A rear edge 111a of the locking catch 111 is used as a locking edge which extends in the right/left direction. An edge 111b which forwardly extends from the left edge of the locking edge 111a is used as a cam edge to be pressed which extends to the right as it approaches the front side.

The member 109a of the REW lever 109 is located in the hole 110 of the locking lever 95. When the REW lever 109 is held at a non-pressing or non-depressed position shown in FIG. 16, the member 109a faces the edge 111b of the locking catch 111 from the front side. When the REW lever 109 is depressed, the member 109a presses the edge 111b of the locking catch 111, so that the locking lever 95 is moved to the right. When the REW lever 109 has reached the depressed position shown in FIG. 20, the member 109a has moved around the edge 111b to the rear side. Thus, the locking lever 95 is moved to the left by the elastic spring force applied to the lever 95 and the locking edge 111a is located on the front side of the member 109a to be locked. Therefore, even if the force which depressed the REW lever 109 to the rear side is eliminated, the member 109a comes into engagement with the locking edge 111a on the rear side and the REW lever 109 is locked in the depressed position.

For a period of time when the REW lever 109 moves from the non-depressed position to the depressed position, the pressing member 109b escapes from the cam edge 42 of the REW gear arm 40 to the rear side. Consequently, the REW gear arm 40 is rotated counterclockwise by the stretching force of the tension spring 43 (FIG. 20) and the REW gear 41 comes into engagement with the junction gear 76. On the other hand, for a period of time when the REW lever 109 is returned from the depressed position to the non-depressed position, the pressing member 109b forwardly presses the cam edge 42 of the REW gear arm 40. Therefore, the REW gear arm 40 is rotated clockwise against the stretching force of the tension spring 43 and the REW gear 41 is moved away from the junction gear 76.

An FF lever 112 is supported on the main chassis 13 on the left side of the REW lever 109 so as to be slidable in the front/rear direction. A forward moving force is applied to the FF lever 112 by elastic spring means (not shown). A locking member 112a and a pressing member 112b, respectively, project from the FF lever 112.

A hole 113 is formed in the locking lever 95 on the left side of the hole 110 and is elongated in the front-/rear direction. A locking catch or hook 14 projects toward the left at the right side edge of the hole 113. A rear edge 114a of the locking catch 114 is used as a locking edge which extends in the right/left direction. An edge 114b which extends forward from the left edge of the locking edge 114a is used as a pressing or cam edge which extends to the right as it approaches the front side.

The member 112a of the FF lever 112 is located in the hole 113 of the locking lever 95. When the FF lever 112 is located at the non-depressed position shown in FIG. 16, the member 112a faces the edge 114b of the locking catch 114 from the front side. When the FF lever 112 is depressed, the member 112a presses the cam edge 114b of the locking catch 114, so that the locking lever 95 is moved to the right. When the FF lever 112 has reached the depressed position shown in FIG. 21, the member 112 has moved around the edge 114b to the rear side. Therefore, the locking lever 95 is moved to the left by the elastic spring force applied to the lever 95 and the locking edge 114a is located on the front side of the member 112a to be locked. Thus, even if the force which pressed the FF lever 112 to the rear side is eliminated, the member 112a comes into engagement with the locking edge 114a from the rear side and the FF lever 112 is locked in the depressed position.

For a period of time when the FF lever 112 moves from the non-depressed position toward the depressed position, the pressing member 112b escapes from the cam edge 38 of the FF gear arm 36 to the rear side. Thus, the FF gear arm 36 is rotated clockwise by the stretching force of the tension spring 39 and the FF gear 37 comes into engagement with the junction gear 75. On the other hand, for a period of time when the FF lever 112 is returned from the depressed position to the non-depressed position, the pressing member 112b forwardly presses the cam edge 38 of the FF gear arm 36, so that the FF gear arm 36 is rotated counterclockwise against the stretching force of the tension spring 39 and the FF gear 37 is moved away from the junction gear 75.

b-5 Operation

The outline of the operation of the above tape player will now be described.

First, to load the tape cassette 1, the stop/eject lever 93 is depressed. Thus, the member 103 of the junction lever 102 is depressed by the pressing edge 93a of the stop/eject lever 93 and the junction lever 102 is rearwardly moved together with the supporting lever 99. The portion 82a is rearwardly pressed by the pressing member 104 of the junction lever 102 which moves to the rear side. Thus, the head moving lever 82 is rotated clockwise and the head base 52 is rearwardly moved, so that the head drum 23 is moved to the third position.

When the head drum 23 is moved to the third position, the locking state of the cassette holder 46 is released and the cassette holder 46 is moved to the ejecting position shown in FIG. 12 by elastic spring means (not shown).

When the tape cassette 1 is inserted into the cassette holding portion 47 of the cassette holder 46 located at the ejecting position, the front lid 11 is moved to the opened position. The tape cassette 1 can be turned over and used. Even if the tape cassette 1 is inserted into the cassette holding portion 47 with either side up, the front lid 11 is upwardly rotated. On the other hand, the recording on the magnetic tape 4 is executed in a manner such that an oblique recording track by what is called a helical scan is formed in one of the two regions which were divided in the width direction.

When the cassette holder 46, into which the tape cassette 1 was inserted, is downwardly rotated and moved to the cassette loading portion 29 and the tape cassette 1 has reached the loading position (FIG. 13), the locking state in which the head drum 23 was held at the third position is released. Therefore, the head moving lever 82 is rotated counterclockwise by the stretching force of the tension spring 91 until the stopper edge 82b comes into contact with the stopper member 87 of the play lever 84, so that the head drum 23 reaches the second position. The state shown in FIG. 16 is a stop state (stop mode) and in this state, the junction gears 75 and 76 are away from the play gear 32, FF gear 37, and REW gear 41.

Figure 21:
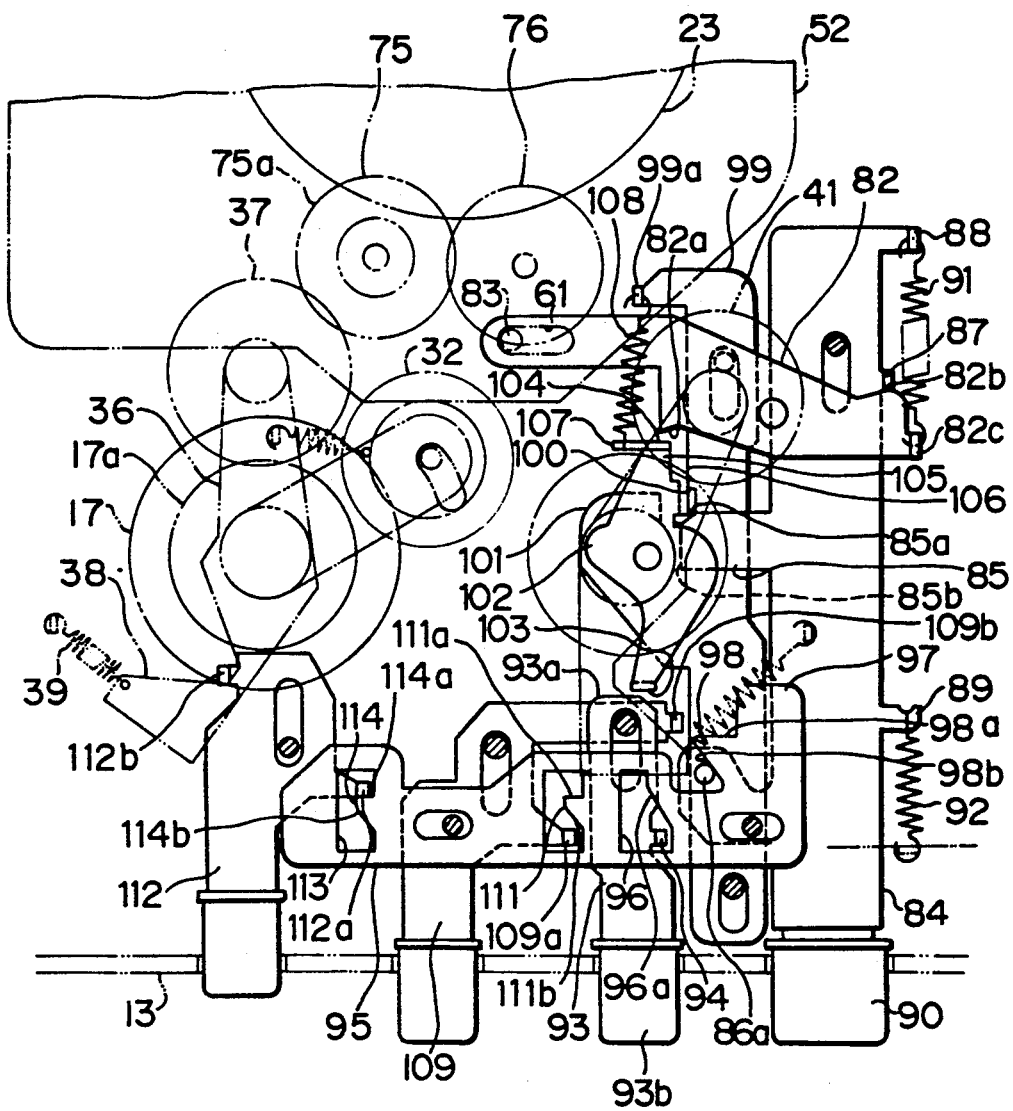

When the FF lever 112 is moved to the depressed position from this state, the FF gear 37 comes into engagement with the junction gear 75 and the drum motor 66 of the head drum 23 is rotated, as shown in FIG. 21, so that the FF mode in which the reel base 16 is rotated in the tape take-up direction at a high speed is formed.

Figure 20:
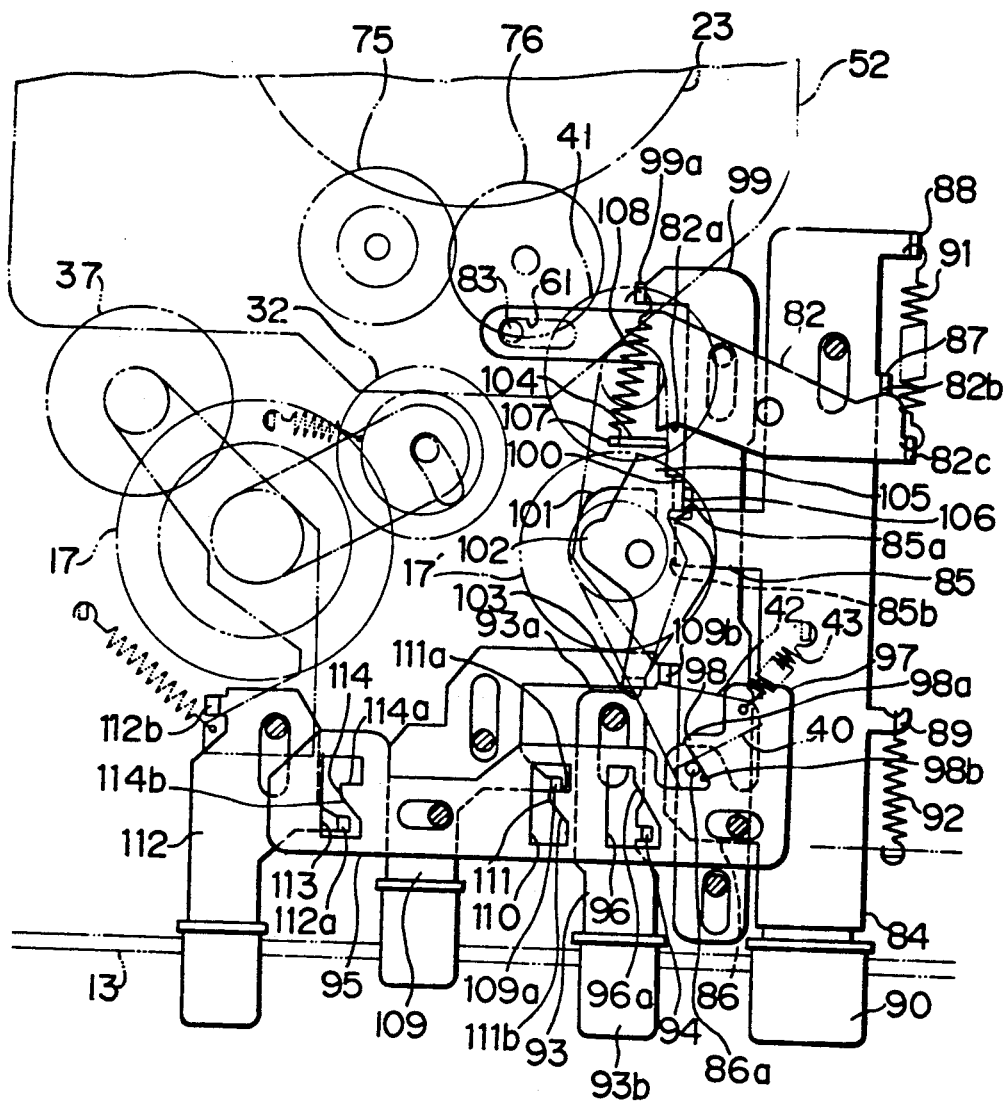

On the other hand, when the REW lever 109 is moved to the depressed position from the stop state, the REW gear 41 comes into engagement with the junction gear 76 and the drum motor 66 is rotated, as shown in FIG. 20, so that the REW mode in which the reel base 15 is rotated in the tape take-up direction at a high speed is formed.

On the other hand, when the head drum 23 is located at the second position, the magnetic heads 25 move in a slight contact relation with the magnetic tape 4. Therefore, while the magnetic tape 4 is run at a high speed, the signal reading operation is simultaneously executed by the magnetic head 25 as in the FF or REW mode mentioned above, and the searching mode can also be formed.

The above high-speed running mode or the searching mode can be also directly set from the mode other than the stop mode. This is because when either the FF lever 112 or the REW lever 109 are depressed, the locking lever 95 is moved in the unlocking direction, so that the just preceding mode is released and the mode by the depression of the FF lever 112 or REW lever 109 is formed.

Then, when the play lever 84 is moved to the depressed position, the head drum 23 is moved to the first position and the small gear 75b of the junction gear 75 comes into engagement with the large gear 32a of the play gear 32, as mentioned above. At this time, the play gear arm 31 is slightly rotated clockwise and the tension spring 35 is stretched, so that the small gear 75b of the junction gear 75 and the large gear 32a of the play gear 32 properly come into pressure contact with each other. The drum motor 66 is rotated, the reel base 16 is rotated in the tape take-up direction, and the recording and/or reproducing modes are formed.

The recording and/or reproducing modes are/is cancelled by depressing either the stop/eject lever 93, the REW lever 109, or the FF lever 112 and the and the operating mode is set to a mode by the depression of each lever.

c) Modifications

Modifications of the tape player having a rotary head according to the invention will now be described.

c-1 First modification

Figure 22:
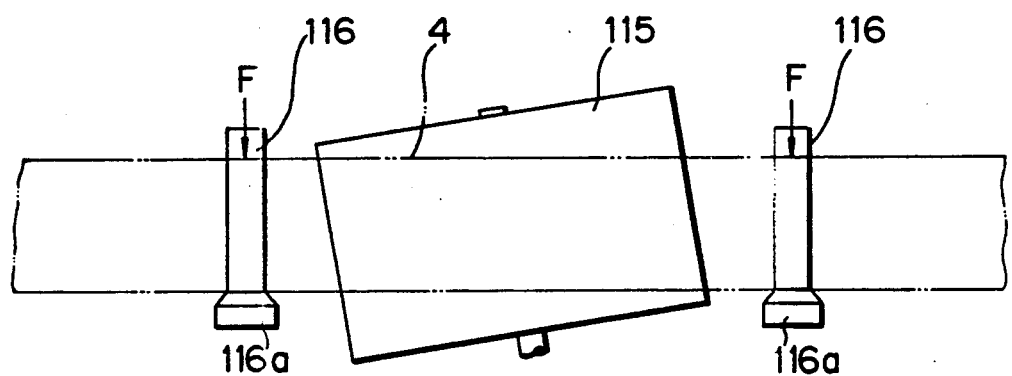
FIG. 22 is a schematic front view showing a first modification.

FIG. 22 shows only the main section of the first modification.

Although a head drum 115, which has a cylindrical shape, has been shown here, any type of head drum 115 can also be used. That is, it is possible to use any one of the types, for example a type in which the upper drum is rotatable and the lower drum is fixed, the type in which the upper drum is fixed and the lower drum is rotatable, the type in which the upper and lower drums are fixed and the inner drum is rotatable, the type in which the drums are integrally formed, and the like if all of the above types have an outer peripheral surface to wrap a tape. The details of the rotary head and the like are not shown. The points described above are also similarly applied to the following description of the second modification.

Tape guides 116 are arranged on both sides of the head drum 115. Restricting flanges 116a are formed in the lower edge portions of the tape guides 116. These flanges 116a can also be formed in the upper edge portions of the tape guides 116.

The magnetic tape 4 is wrapped around the tape guides 116 in both side portions of the head drum 115 and is moved. At the positions of the tape guides 116, downwardly moving forces F are applied to the tape 4. Thus, the lower side edge of the magnetic tape 4 comes into slide contact with the restricting flanges 116a, thereby restricting the relative position for the head drum 115. In the case where the flanges 116a are formed in the upper edge portions, it is sufficient to apply the upwardly moving force to the magnetic tape 4.

c-2 Second Modification

Figure 23:
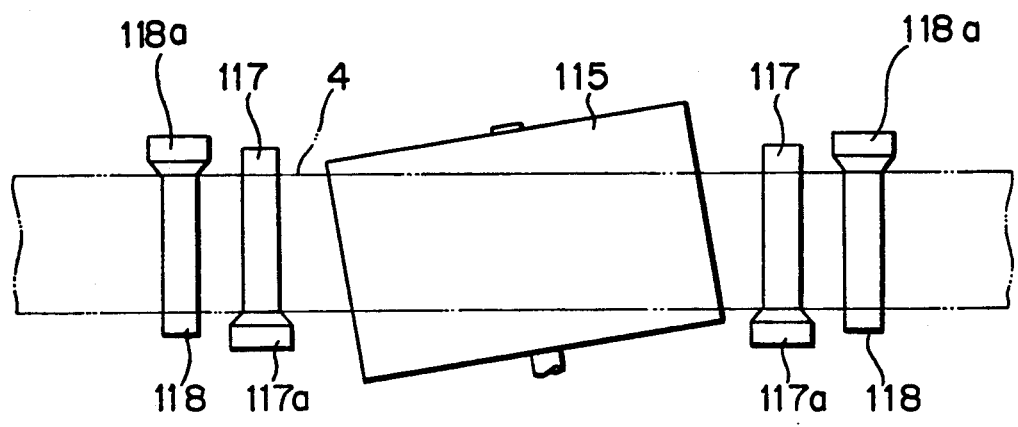
FIG. 23 is a schematic front view showing a second modification.

FIG. 23 shows the second modification, which has two tape guides 117 and two tape guides 118 that are provided on both sides of the head drum 115, respectively.

Restricting flanges 117a are formed in the lower edge portions of the tape guides 117, which are closer to the head drum 115. Restricting flanges 118a formed in the upper edge portions of the tape guides 118, which are at remote positions from the head drum 115. Distances between the restricting flanges 117a and 118a are equal to the width of the magnetic tape 4 when they are seen from the running direction of the magnetic tape 4. The magnetic tape 4 is wrapped around the tape guides 117 and 118 and is moved in a state in which the relative position for the head drum 115 is restricted. The positions of the tape guides 117 and 118 can also be exchanged.

In the above two modifications, the external parts, such as subguides 10 in the tape cassette 1 shown in the embodiment can also come into contact with the magnetic tape 4 between the tape guides 116 and 117 and the head drum 115.

Although various minor modifications may be suggested by those versed in the art, it should be understood that we wish to embody within the scope of the patent granted hereon all such modifications as reasonably and properly come within the scope of our contribution to the art.

We claim:

1. A rotary head type tape recording and/or reproducing apparatus comprising:

rotary head drum means having a rotary head for recording and/or reproducing information signals onto/from a magnetic tape helically wrapped around said rotary head drum means with a predetermined wrap angle and an outer peripheral surface of the rotary head drum means being free of leads for restricting the movement of the wrapped magnetic tape in the width direction of the tape;

a pair of tape guide means having flange portions for restricting the movement of the magnetic tape in the width direction; and head drum supporting and moving means for fixing said rotary head drum means and said pair of tape guide means and for moving the rotary head drum means and said pair of tape guide means between a first position in contact with a cassette loading means for loading and supporting a tape cassette in which the magnetic tape is enclosed and a second position away from said cassette loading means, said head drum supporting and moving means including a base member, said pair of tape guide means being fixedly mounted on said base member in spaced positions and said rotary head drum means being mounted on the base member between said pair of tape guide means so that the tape is guided by the guide means onto said rotary head.

2. A rotary head type tape recording and/or reproducing apparatus according to claim 1, said tape guide means comprising flange portions provided on the upper and lower edges thereof.

3. A rotary head type tape recording and/or reproducing apparatus according to claim 1, said tape guide means comprising flange portions provided on at least one of the upper and lower edges thereof.

4. A rotary head type tape recording and/or reproducing apparatus according to claim 1, wherein each tape guide means of said pair of tape guide means comprises two tape guides with one tape guide of each two tape guides having a flange portion on the lower edge portion thereof.

5. A rotary head type tape recording and/or reproducing apparatus according to claim 1, wherein the first position at which said head drum supporting and moving means moves relative to said cassette loading means to be close thereto and the second position at which said head drum supporting and moving means moves relative to said cassette loading means to be away therefrom can be set, and the magnetic tape is wrapped around said rotary head drum means and a predetermined tape path is formed by said pair of tape guide means only when said head drum supporting and moving means is set to the first position.

6. A rotary head type tape recording and/or reproducing apparatus according to claim 5, wherein when said head drum supporting and moving means is set to the first position, a part of said rotary head drum means and said pair of tape guide means are inserted into the tape cassette loaded on said cassette loading means and in this state recording and/or reproduction onto/from the magnetic tape are/is executed by said rotary head.

* * * * *